Oct. 19, 1948.　　　　　L. E. RUSH　　　　　2,451,776
PREDETERMINED STOP DISPENSING MECHANISM OF
COIN AND MANUAL CONTROLLED TYPE
Filed Dec. 30, 1939　　　　　　　　　　　　11 Sheets-Sheet 1
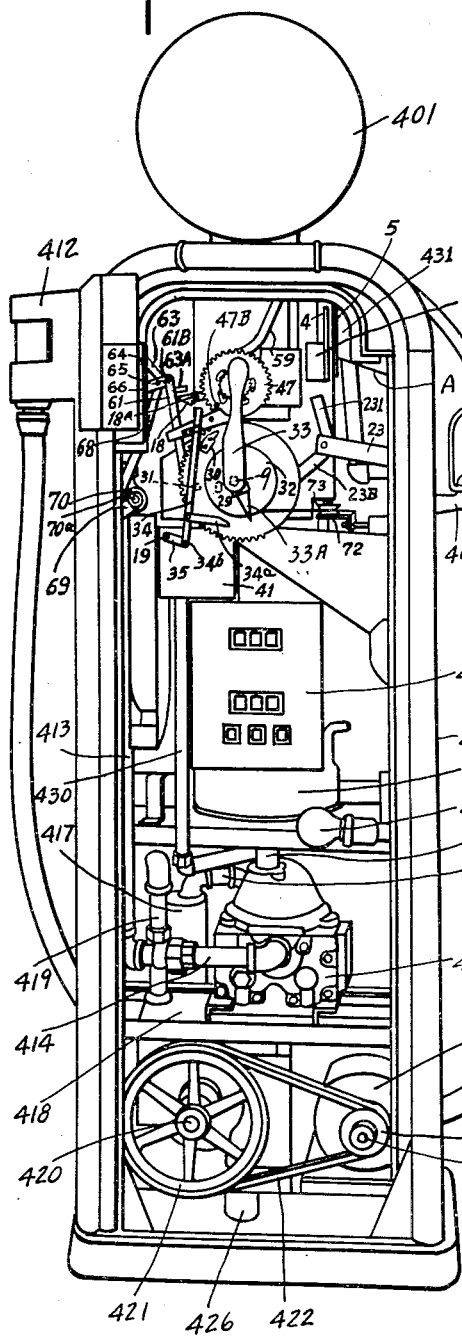
INVENTOR.
LEO E. RUSH.
BY Lockwood, Goldsmith & Galt
ATTORNEYS.

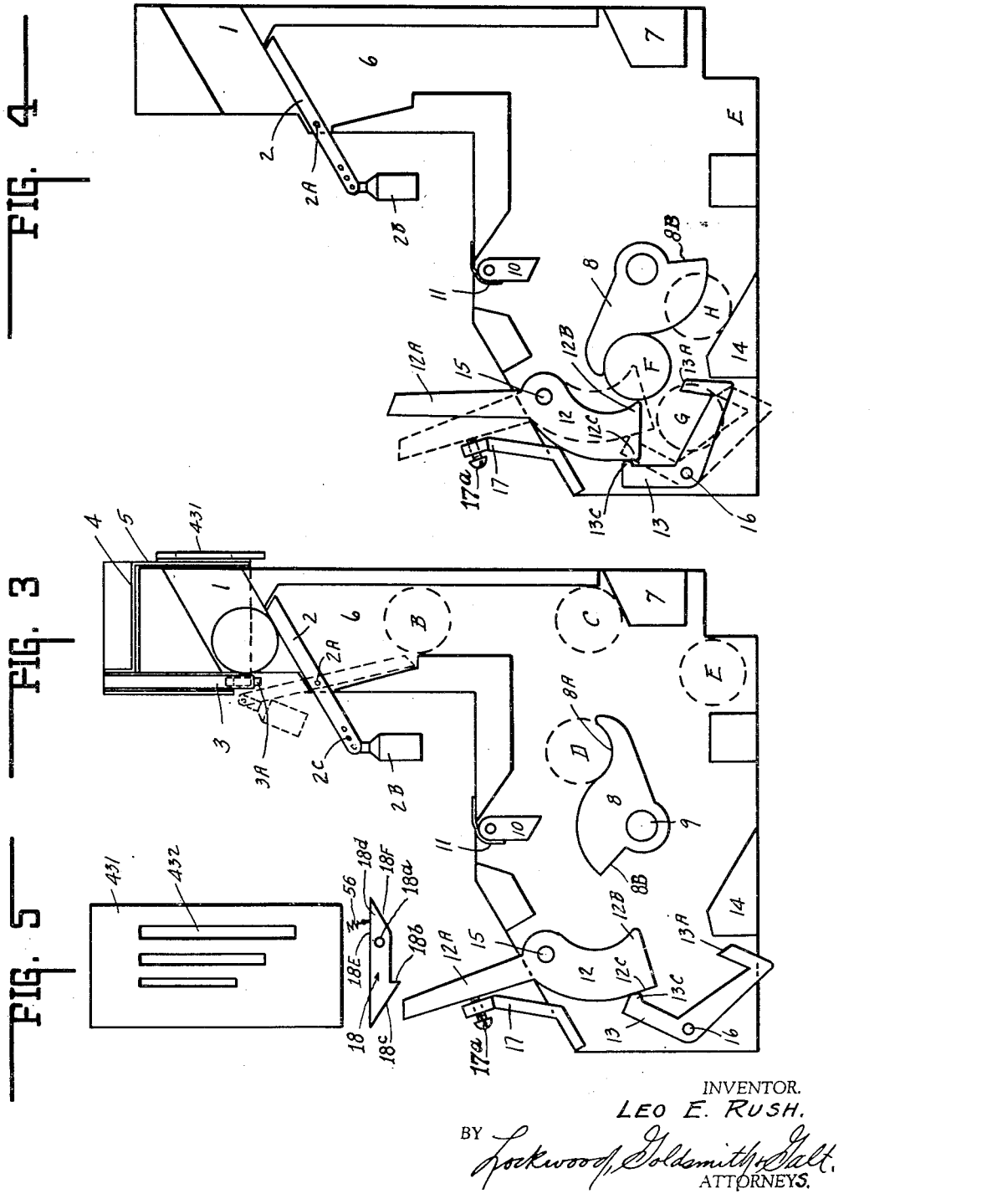

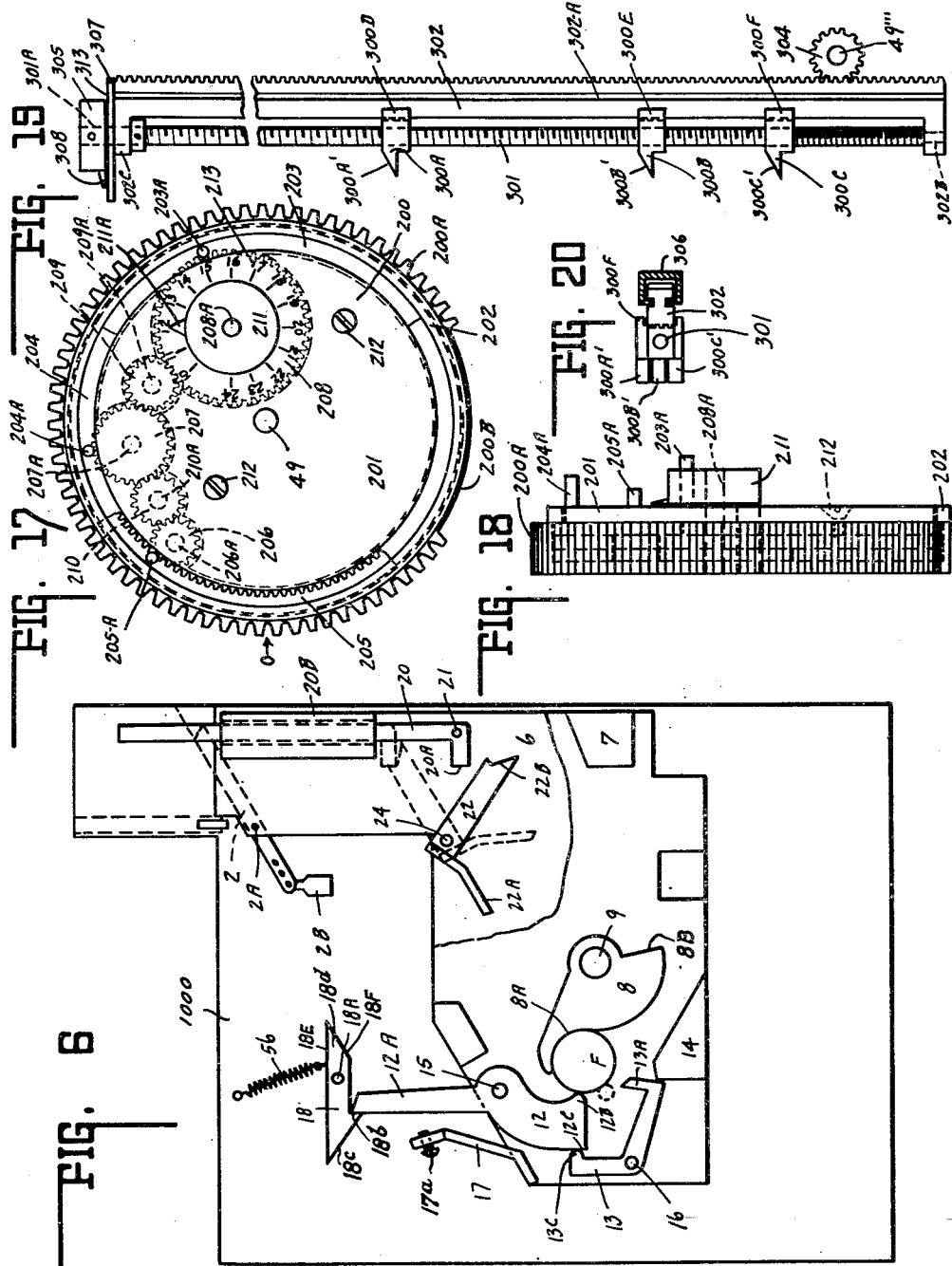

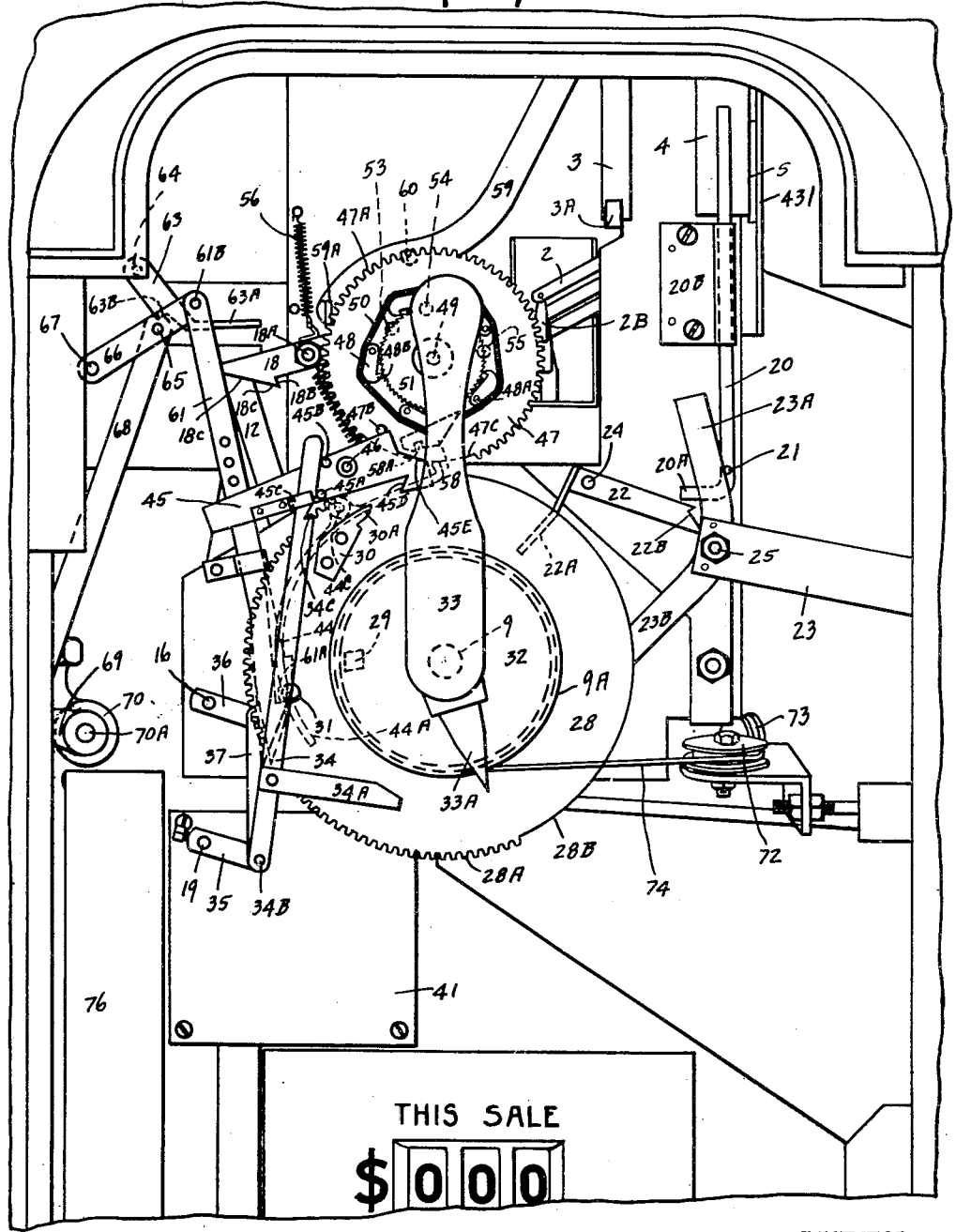

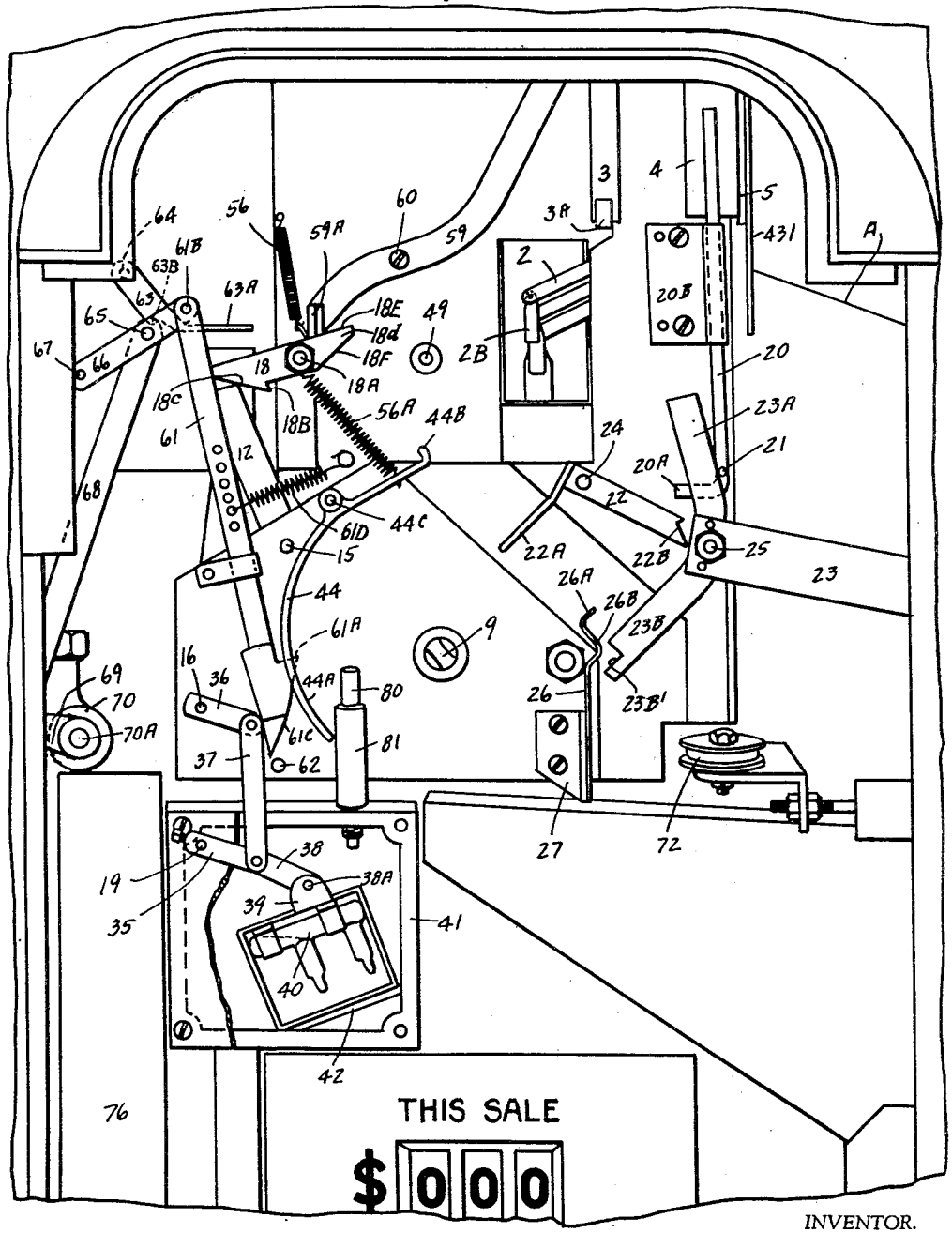

Oct. 19, 1948.  L. E. RUSH  2,451,776
PREDETERMINED STOP DISPENSING MECHANISM OF
COIN AND MANUAL CONTROLLED TYPE
Filed Dec. 30, 1939  11 Sheets-Sheet 6

INVENTOR.
LEO E. RUSH.
BY Lockwood, Goldsmith & Galt
ATTORNEYS.

Oct. 19, 1948.  L. E. RUSH  2,451,776
PREDETERMINED STOP DISPENSING MECHANISM OF
COIN AND MANUAL CONTROLLED TYPE
Filed Dec. 30, 1939  11 Sheets-Sheet 7
FIG. 11
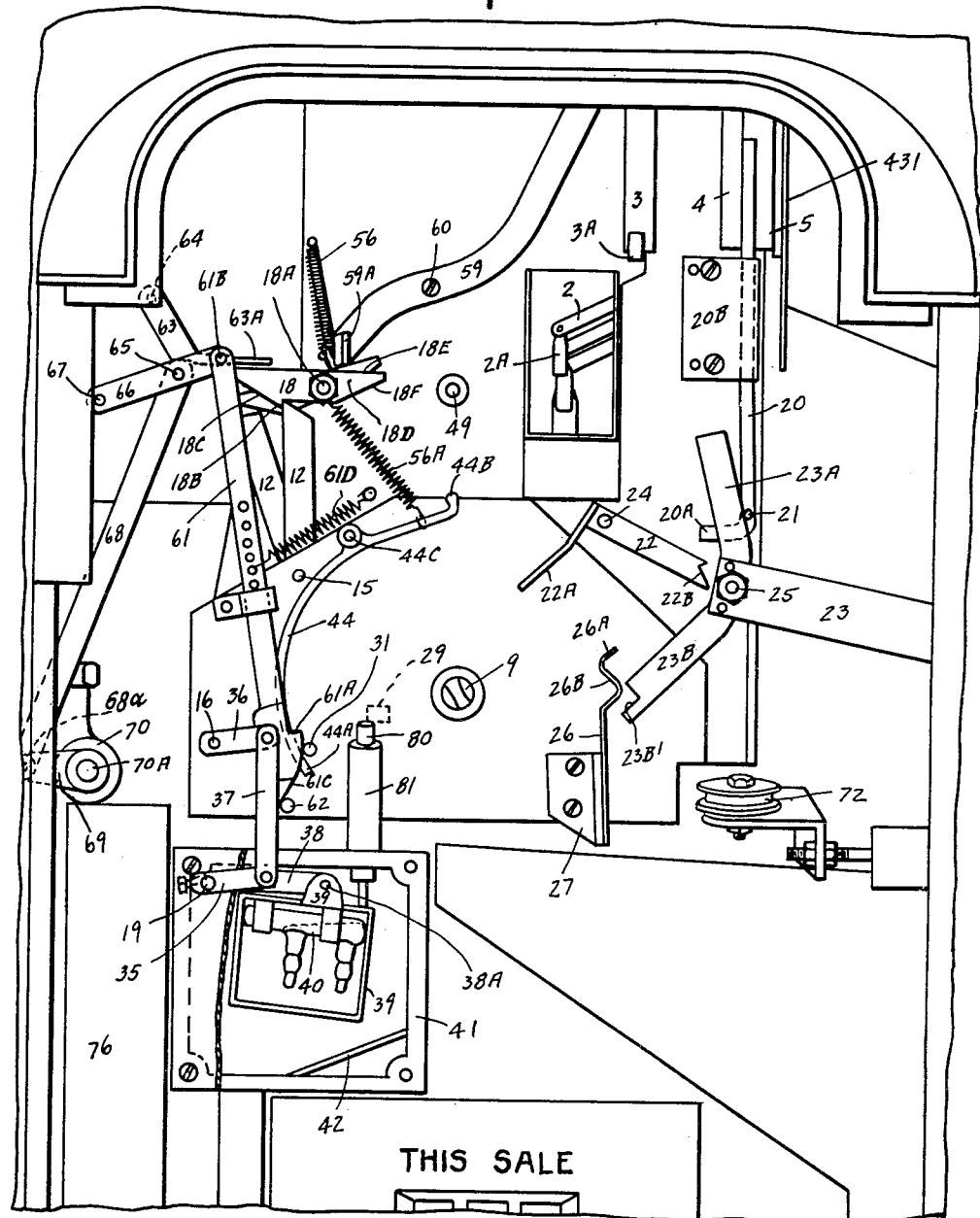
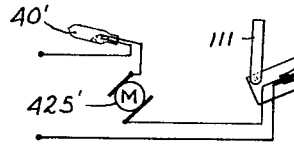
FIG. 15-A
INVENTOR.
LEO E. RUSH.
BY Lockwood, Goldsmith & Galt
ATTORNEYS.

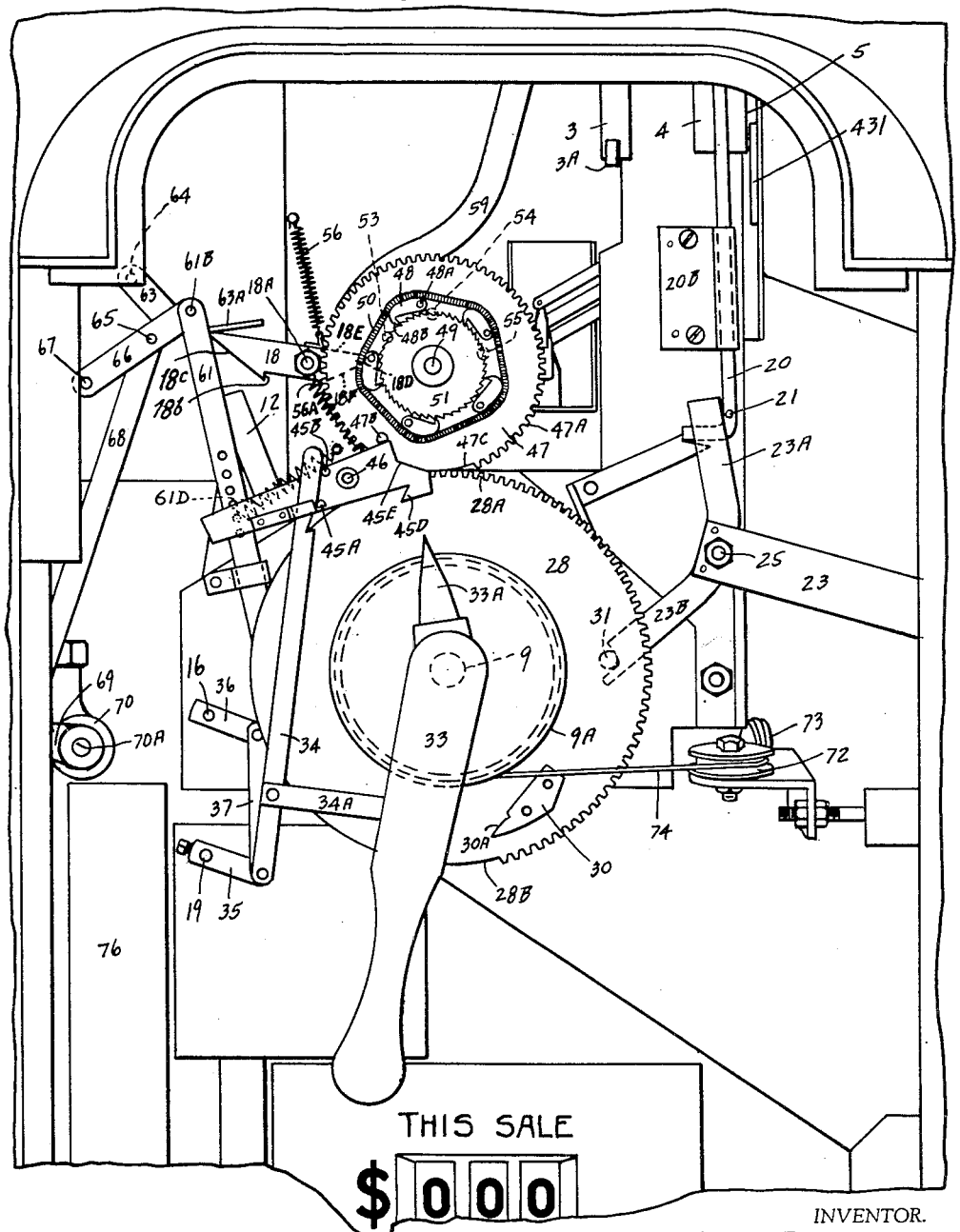

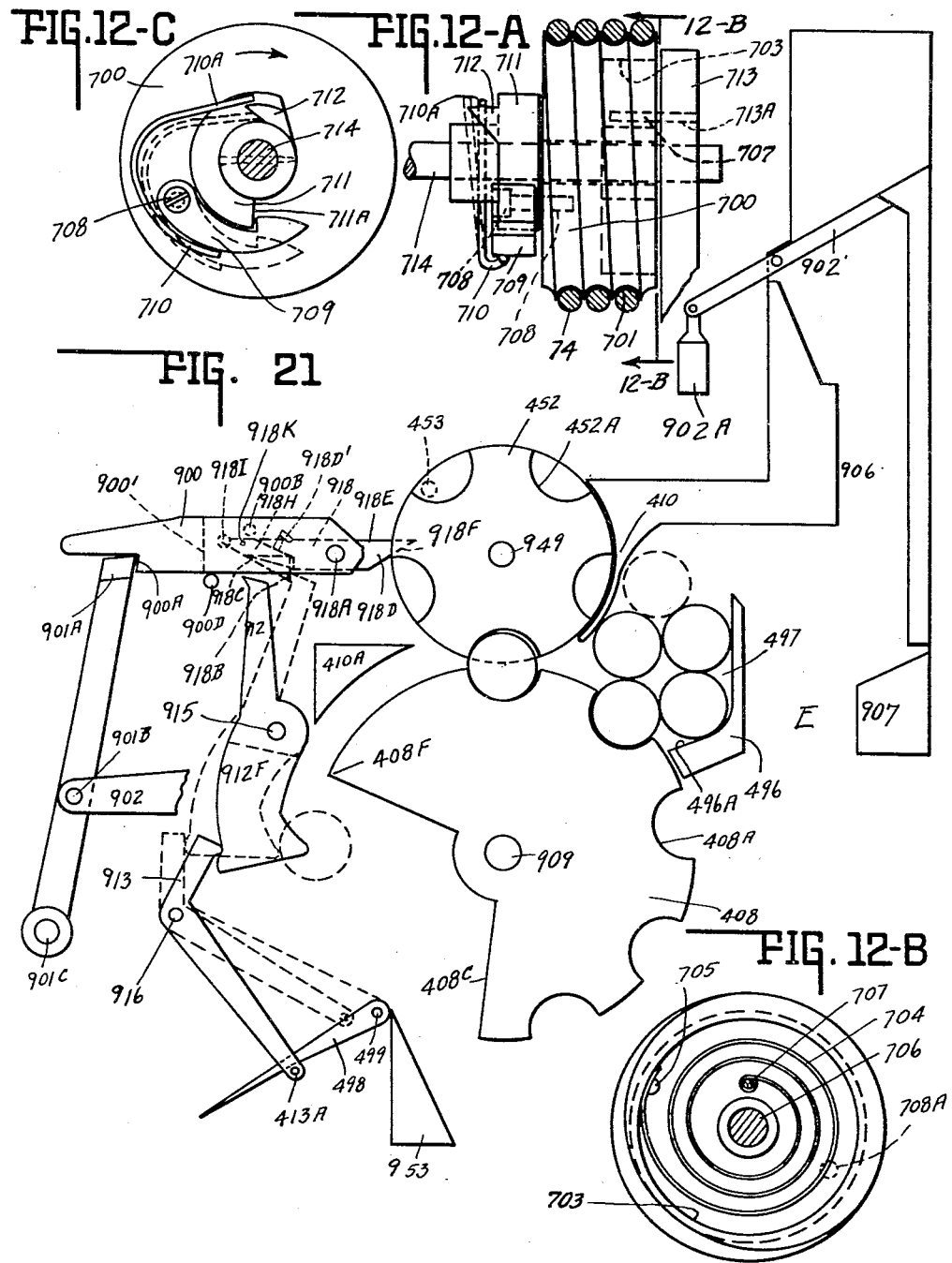

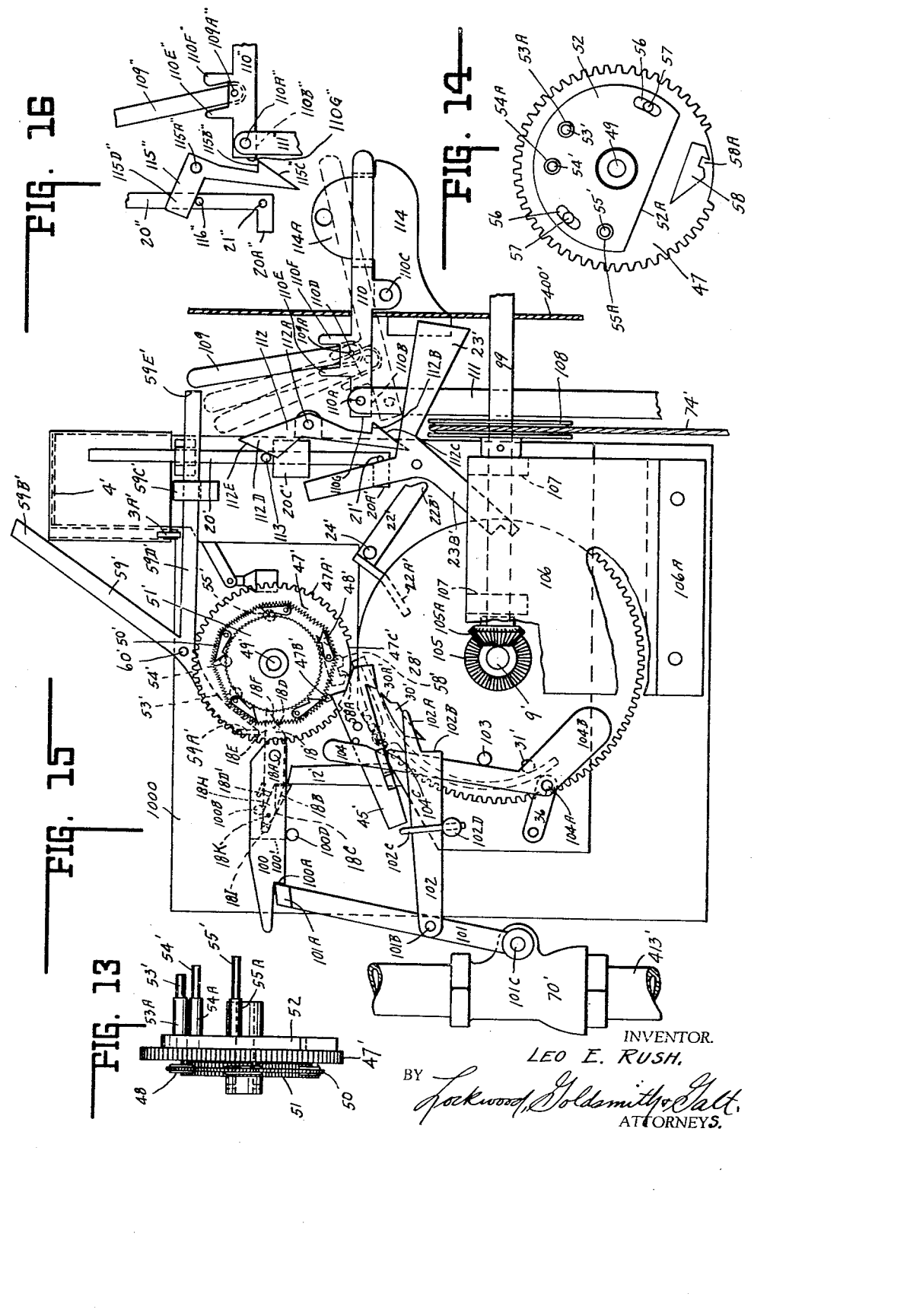

Oct. 19, 1948.                                L. E. RUSH                    2,451,776
                   PREDETERMINED STOP DISPENSING MECHANISM OF
                         COIN AND MANUAL CONTROLLED TYPE
Filed Dec. 30, 1939                                         11 Sheets-Sheet 11

INVENTOR.
LEO E. RUSH.
BY Lockwood, Goldsmith & Galt
                    ATTORNEYS.

Patented Oct. 19, 1948

2,451,776

UNITED STATES PATENT OFFICE 2,451,776

PREDETERMINED STOP DISPENSING MECH-ANISM OF COIN AND MANUAL CONTROLLED TYPE

Leo E. Rush, West Lafayette, Ind., assignor to Gasoteria Corporation, Buffalo, N. Y., a corporation of New York Application December 30, 1939, Serial No. 311,734

41 Claims. (Cl. 194—90)

This invention relates to an automatic pump or dispensing device for the dispensing of liquids, more especially gasoline and lubricating oils, et cetera.

Insofar as the first embodiment pump is of coin controlled or operable type, it is to be understood that broadly a coin controlled or operable pump is old, see the Leo Rush prior Patent No. 1,891,950 dated December 27, 1932, wherein a coin controls the reservoir so that the same is filled only to the proper degree or volume corresponding to the coin utilized and thereafter that predetermined volume is released to the purchaser.

In the present invention there is disclosed a simplification of that more complicated mechanism and combination disclosed in said patent in that herein there is embodied an outlet valve which, in the coin control type, is controlled automatically and mechanically by a coin so that when the valve is open and following predetermined discharge through that valve, such determination being made by said coin, the valve is instantaneously closed. It is also to be understood that certain portions of the present invention are applicable to pumps for the dispensing of products of the general character indicated and which pumps are not necessarily coin actuated or controlled. In common with most pumps of the so-called metering type, as distinguished from the so-called visible bowl type, see the prior Rush patent as an example of the latter, there is included a motor, a pressure pump operable thereby, an operating mechanism of metering, measuring or computing character, and a hose discharge, the outlet of which, if of "wet" hose type, is provided with a manually controlled valve. This wet hose construction includes a hand operable pressure control valve whereby the entire liquid supply system is maintained full or "wet" up to the manual nozzle valve on the hose. This well known hose nozzle and valve structure will be described more fully hereinafter. The present invention, however, as will appear more fully hereinafter, is not necessarily of the wet hose type but may be of the dry hose type.

When the invention herein is a coin operable or controlled pump, the latter includes a control handle. This handle usually must be turned so that the mechanism is returned to the zero open position so that the coin mechanism is returned to initial or coin receiving position. This handle, in one form of the invention and that herein illustrated initially, is in the front of the pump and this movement is clockwise. In another embodiment of the invention, also illustrated herein, the handle is in the side of the pump and the conditioning movement of this second handle is counter-clockwise.

Having positioned, through the handle, the parts in proper relation to initiate the sale and dispensing of gasoline or the like, the proper coin is inserted in the proper coin slot and the coin mechanism then becomes effective upon the release of the coin to the coin mechanism by the potential purchaser.

One form of coin selecting mechanism is shown in the aforementioned patent. Another form, and that herein rather schematically illustrated and also briefly described hereinafter, may also be used. Any other form of coin receiving and determining mechanism such as hereinafter pointed out may be substituted providing the final functions of said mechanism are substantially as required for the remainder of this pump mechanism when of coin operable or controlled type.

In common with the disclosure of the prior patent mentioned, insertion of legal coins in improper slots results in the return of said legal coin to the purchaser and no pump action or dispensing occurs. The insertion of improper size, spurious coins or slugs in the same slots will likewise return such coins or slugs to the potential purchaser and the insertion of spurious coins or slugs in the proper slot so far as size is concerned will also result in the return of such coins or slugs to the potential purchaser.

Only a single legal coin, inserted in the proper corresponding slot, will become effective for coin control and operation of the pump, as disclosed in the majority of coin operable embodiments illustrated herein. This coin, after passing through the selecting or coin rejecting mechanism, is associated with the coin carrier mechanism. This may take several forms. When the handle is rotated from coin receiving position following deposition of the proper coin, as aforesaid, said coin simultaneously, in the first form of the invention, accomplishes two things: it conditions the motor switch for circuit closing and it actuates a corresponding individual control which, in turn, is cooperatively associated with individual controls and these in turn are controlled by a common control, as hereinafter pointed out.

When the handle connected to the coin carrier last mentioned is further rotated in the same and proper direction beyond the position where the coin has conditioned the motor switch and has engaged the individual value or volume selecting lever or indicator, the same being determinable by the coin employed, a member movable with the handle actutaes a member controlling the fuel outlet valve of the pump and conditions the latter for open valve position or fluid discharge. Simultaneously therewith, or substantially so, a switch actuating member is also actuated which actuates the previously conditioned motor controlling switch to actually close the motor circuit for initiation of dispensing if of dry hose type or readiness for dispensing if of wet hose type.

Associated with the dispensing hose and more especially with the hose hanger lever, common to dispensing-meter pumps of this character, may be a switch which is also included in the motor circuit. These two switches may be in series connection in the motor circuit and in the same current supply line or one may be in each line. Thus, in this instance, while the discharge or outlet valve may be open and the mercury switch conditioned by the coin may be closed, the motor still would not function to operate the pump until the hose was removed from the hose hanger, thereby actuating that switch to close the motor circuit. Conversely the hose may be returned to its hanger lever and no fluid would be dispensed.

The pump intake connects to a storage reservoir and the pump discharge connects to the outlet valve previously mentioned, the latter in turn connecting to the hand nozzle controlled hose structure. There is provided in this pressure fluid system, a bypass around the pump. Usually this is included in the pump, being merely a relief valve controlled waste to the intake side of the pump.

Now, if the outlet valve beforementioned be not open and the pump be operated by the motor, the pump will bypass all surplus liquid. In the event the outlet valve is open and the hand valve on the hose nozzle be closed, pressure will build up in the system behind this valve controlled hand nozzle and again the fluid from the pump will be bypassed. In the event the valves are properly conditioned, the fluid will be discharged, as pumped, and this will continue so long as both outlet and nozzle valves remain open and the computing mechanism permits further fluid discharge, as hereinafter set forth, which computing mechanism, meter or like, operable for measurement, is the essential feature common to all embodiments of the invention herein disclosed, and whether coin operable or controlled direct or remote, or operator selected.

As previously set forth, a wet hose structure includes an automatic, pressure operable valve which requires the application of pressure of a predetermined amount before the same can discharge from the hose, if the hand nozzle valve thereof be open, so that at all times the system, as set forth, remains full or "wet" with the liquid to be dispensed.

Reference will now be had to the so-called predetermined stop or computing mechanism. The flow of liquid to or through the system between the pump bypass, whether ahead of or behind the outlet valve referred to, and the hose may be passed through a computer which indicates money value or volume value of said fluid or both or through a computing meter or a meter driving a computing device. The first mentioned of these devices is of the broad character represented by the invention set forth in the Leo Rush copending application entitled "Variable stroke meter," filed July 13, 1938, Serial No. 219,028, now Patent No. 2,259,567, dated October 21, 1941. The second mentioned type of mechanism is that herein disclosed in the first form of the invention to be described.

One type of computing or measuring mechanism is the so-called Wayne computer driven by a meter. Another is the Neptune computer driven by a meter; another, manufactured by Ferro, is computer meter driven by a motor; and a fourth is the service station equipment computer driven by a meter.

In the first form of the invention, illustrated herein, the invention is represented as being associated with a Wayne computer driven by a meter and it is associated with the "variable" shaft of said computer and is operable thereby in accordance with fluid flow. This "variable" speed shaft is a shaft which rotates at a constant speed at any base price for the liquid, but can be adjusted for the different speeds in accordance with different base prices. Thus the present invention of the first form hereinafter to be described, includes a mechanism which for any given price base operates at a constant speed and the amount of operation is proportional to the amount of fluid discharged or dispensed.

As soon as the fluid to be dispensed starts to flow in the act of dispensing, this source of power (the flow of fluid) becomes effective on mechanism which operates in accordance with that flow and proportional to that flow. This mechanism, for multiple volume or value dispensing, is provided with a plurality of properly positioned stops, each of which successively moves into so-called "operative position" proportional to the amount of fluid dispensed, or a single stop movable for setting purposes into any predetermined position for the dispensing of a corresponding fluid volume.

Each stop is conditioned to actuate the common mechanism for the immediate closing of the outlet valve and the immediate opening of the motor circuit when the stop in question becomes associated with the previously coin selected mechanism, previously described. Thereupon all the parts are so conditioned that no further dispensing occurs and the motor and pump cease operation. The pump also is locked against further manipulation except to permit the return of the parts, as hereinafter pointed out to the "zero open" or what corresponds to the coin receiving position, with this exception that in the coin operable embodiment of the invention when the outlet valve is closed and the motor circuit is broken, the coin which has been the instrumentality so far employed as the value or volume selecting element is then discharged to the money box permitting automatic movement of the motor switch to be moved to a position in which it cannot be actuated for closing the circuit and when thus positioned, it is in the normal open position.

A second embodiment of the invention herein illustrated and hereinafter to be described embodies but a single switch and this is associated with the hose hanger or like means and the motor switch hereinbefore referred to conditioned by the coin, is omitted, this being a simplification of the first embodiment. So far as this species of the invention is concerned, as hereinafter will be pointed out more fully, the same is capable of several applications. In most instances, however, it is coin controlled to the extent of determining the volume to be dispensed, unless manual operation is employed.

While all of the foregoing has been directed to a coin operable pump, it is to be understood that various portions of the mechanism may be incorporated in pumps which are manually controlled and in which the coin itself need not be used. For example, an attendant may operate any one of several manual controls, such as switches, knobs, buttons, and the like, certain of which are individualized with respect to a value or volume determining member in turn controlling much of the mechanism that has heretofore thus been previously described, or a single member may be manually operated by the attendant to obtain such value or volume selection conditioning of the previously described mechanism and there may be retained therewith, as illustrated in the second embodiment of the invention herein disclosed, the motor and pump control associated with hose manipulation, although it is to be understood that such control may be of manual character other than that associated with the hose.

In view of the aforesaid, it will be obvious that in the mechanism herein disclosed, and more especially in the second form of the invention, although parts of the first embodiment of the invention may be thus employed, the motor operating the pump and pump may be dispensed with and a manually operable pump substituted therefor or, if desired, no pump may be employed, but a common pressure line supply or gravity supply to one or more pumps may be utilized, with much of the invention basically disclosed herein.

Inasmuch as tokens may be employed of such character, size, weight, composition, shape or configuration, etc., to operate the herein described mechanism in accordance with the predetermined value or representative quantity of the token, the word "coin" as used herein is understood to include such tokens.

Having thus briefly described the type of structure to which this invention applies, its operation, and having briefly described the basic invention and the several manually and/or coin operable modifications thereof, as well as the specific operation of the basic invention, reference will be had to other objects and features and which hereinafter are set forth more fully in the specific description which follows.

The full nature of the invention will be understood from the accompanying drawings and the following description and claims:

In the drawings, Fig. 1 is a perspective view of the first embodiment of the invention incorporated in a complete coin operable dispensing pump structure and a sectional view of the locked underground storage reservoir with which the pump structure is connected.

Fig. 2 is a front elevation of the pump shown in Fig. 1, the front cover being removed and the previously removed operating handle being replaced, the parts being shown in the position after this pump has been actuated and delivery has been made, but prior to the return of all of the parts to the zero open or coin receiving position.

Fig. 3 is a relatively enlarged diagrammatic elevational view of the coin selecting and coin controlled mechanism showing the same for simplicity, as a single coin operable arrangement and in the coin receiving position.

Fig. 4 is a somewhat similar view of portions of the parts shown in Fig. 3, the full lines indicating a succeeding position wherein the coin has registered its value or volume determining factor and has conditioned the switch controlling mechanism in the closed circuit conditioning position, the dotted lines representing the free or non-determining position of the coin controlled mechanism and the open circuit conditioning position of the motor switch controlling mechanism respectively.

Fig. 5 is a front elevation of a stationary, slotted, multiple coin plate and guard for the shutter.

Fig. 6 is a view similar to Figs. 3 and 4 and illustrates the parts in the position shown in Fig. 4 with the addition of a lock latch individually associated with the coin operable determining member, the coin operable shutter mechanism, in this instance, being shown in the closed or coin blocking position.

Fig. 7 is an enlarged front elevation of the mechanism shown in Figs. 2 and 3 and in the positions corresponding to parts as illustrated in said figures, the outlet valve being shown in closed position.

Fig. 8 is a view similar to Fig. 7 except that the external handle, the two gear structures and mechanism therebetween, have been removed to illustrate more clearly the parts concealed thereby, the parts shown being illustrated in the same position, the outlet valve being shown in closed position.

Figure 9:
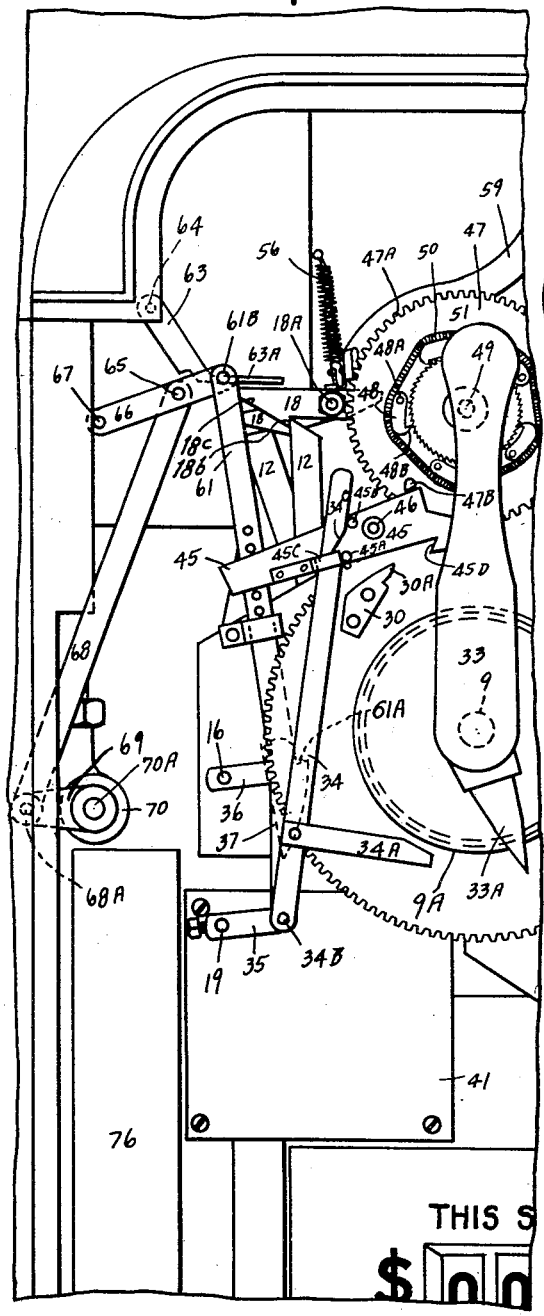

Fig. 9 is a view similar to Fig. 7 but with the parts illustrated in one of the value or volume selectors in caught value or volume selecting position and with the outlet valve controlling mechanism in the open valve position, the outlet valve being shown in the cracked open position.

Figure 10:
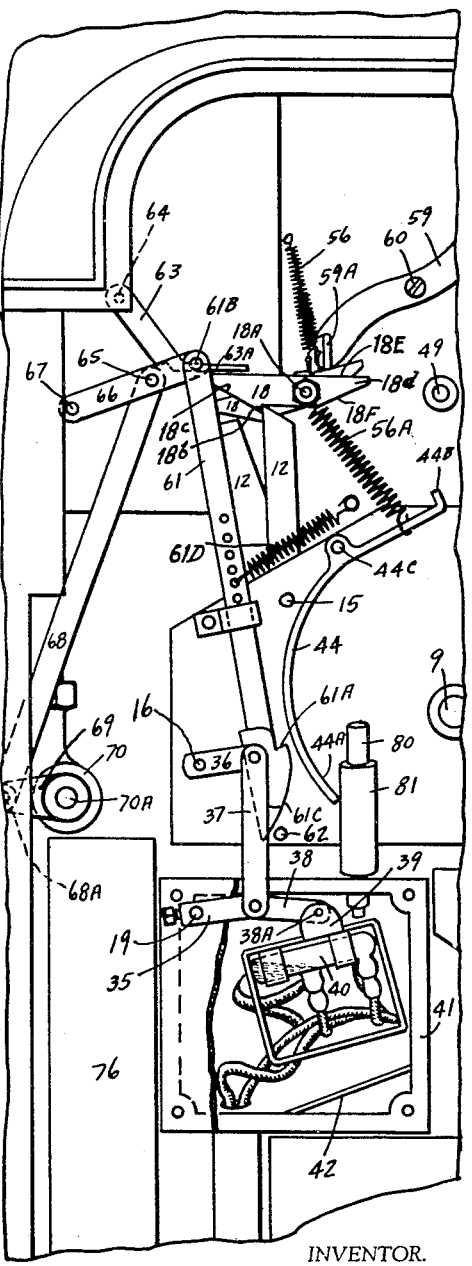

Fig. 10 is a similar view of the same parts, the actuating handle, meshable gears and mechanism therebetween having been removed and the motor switch housing cover being broken away to show the motor switch in the closed circuit condition position but not in closed circuit position, the outlet valve being shown in open position.

Fig. 11 is a view similar to Fig. 8 and, in this instance, the outlet valve again is illustrated in the cracked open position and the value or volume determining member is illustrated in the caught position, but the motor switch is illustrated in the closed condition position and in the closed circuit position for motor operation.

Fig. 12 is a view of the parts illustrated in Figs. 7 and 8, the outlet valve again being shown in closed position, the value or volume selecting member being released from its catch following predetermined discharge or reconditioning under other circumstances and the motor switch controlling mechanism being positioned in the open circuit condition position, all of which represents that condition representing the so-called zero position, the coin associated mechanisms illustrated being shown in the position corresponding to that conditioned for coin reception. All of the foregoing figures illustrate one embodiment of the invention.

Figs. 1, 2 and 7 to 12 are perspective views taken at slightly different perspective angles, wherefore the identically designated parts in these figures, while actually of the same length, etc., in said figures, compared one with the other, may appear as of slightly different lengths, etc., by reasons of the different perspective characters of said figures.

Fig. 12—A is a side elevation of the setback mechanism associated with cable 74, see Fig. 12.

Fig. 12—B is a sectional view taken on line 12B—12B of Fig. 12—A and in the direction of the arrows.

Fig. 12—C is an end view looking in the opposite direction and of the opposite end of the cable drum and the mechanism associated with that end thereof.

Fig. 13 is a side elevation of an adjustable computing construction that may be utilized in the foregoing or other embodiments of the invention, whether of coin operable type or manually operable type.

Fig. 14 is an elevation thereof and it is to be understood that this embodiment of the invention may be utilized whenever extremely accurate stop adjustment for the zero point is desired or required.

Fig. 15 is a diagrammatic elevation of another form of the invention wherein the coin operable motor switch and its mechanism is omitted and the value or volume determining member catch and the valve controlled latch are combined into a unitary arrangement and there is included a hose hanger operable motor switch actuating member. This addition may be employed with the first embodiment of the invention, as previously pointed out for dual switch control of the motor, not illustrated herein. There is also disclosed in this figure a hose hanger operable interlock associated with the supply control mechanism whereby if the hose be hung up previous to the dispensing of all the fluid which has been purchased, the several controls are affected so that the coin is released to the money box and the outlet valve is closed and the several mechanisms are released and returned or conditioned for return to the zero position. While this last mentioned interlock is not disclosed in the embodiment illustrated in Figs. 1 to 12 inclusive, the same may and preferably is incorporated in that embodiment of the invention, but for simplicity, it is merely illustrated in this embodiment of the invention.

Fig. 15—A is a diagram of one possible circuit control of the mechanism illustrated in Fig. 15.

Fig. 16 is a view similar to Fig. 15 of another form of coin operable hose hanger interlock construction, the latter being shown in the released position of the interlock, same being so positioned by means operable with the guardplate, the interlock being released by the dropping of the coin guardplate by and after the insertion of the coin. This operation is similar to that obtained by the form of the invention shown in Fig. 15, except one shows the release by opening of the guardplate and the other the release by the closing of the guardplate.

Fig. 17 is a front elevation of a modified form of an adjustable computer arrangement and can be substituted for its equivalent in any of the three embodiments of the invention previously referred to.

Fig. 18 is a side elevation thereof.

Fig. 19 is a side elevation of a linearly adjustable variable computer which may be embodied in any form of the invention in place of other forms of variable computers such as illustrated in Figs. 13, 14, 17 and 18.

Fig. 20 is a bottom plan view thereof.

Fig. 21 is a diagrammatic representation of a portion of a coin operable form of dispensing apparatus embodying as much or as little of the mechanism of the several previous forms of the invention as required or desired but characterized herein by the modification of several of the parts for the reception of a plurality of coins of like denomination instead of but a single coin of that denomination.

It is to be understood that to effect plural coin deposition the lock for the guard means associated with the coin slot entrance is of necessity dispensed with and other locking mechanism associated therewith may be dispensed with, if desired.

Fig. 22 is a view similar to Fig. 21 in that it is a diagrammatic representation of a portion of a coin operable form of dispensing apparatus embodying much of the mechanism of the several previously referred to embodiments of the invention and further characterized by the fact that the several parts are adapted to simultaneously receive a plurality of coins of the same and/or dissimilar denominations instead of a plurality of coins of a single denomination or a single coin as hereinbefore referred to in connection with other embodiments of the coin operable or coin controlled forms of the invention.

Fig. 23 is a side elevation of the major portion of the essential parts relating to the summation and transfer mechanisms illustrated in Fig. 22 together with the representation of the excess and improper coin return feature.

In Figs. 1 and 2 of the drawings, there is illustrated a dispensing pump suitable for the dispensing of gasoline and in said figures it will be noted that there is a casing structure 400 which mounts an advertising and illuminating globe 401. The front of said casing is closed by a panel 402 having an aperture 403 therein for exposure of a device common in the industry and known as a computer, that herein illustrated being known as the Wayne computer. Herein this computing mechanism is indicated by the numeral 404. The front panel is locked as at 402A and within the casing is a coin box, not shown, access thereto only being had through said lock arrangement. The front panel is apertured at 405 and through the same extends the shaft 9, the exposed end of which mounts the handle 33 and which has the indicator 33A thereon. At one side of the casing or housing is a hose hanger 406 which is adapted to support the dispensing nozzle structure 407 at the end of a hose 408. This nozzle structure includes a valve 409 which has a manually operable member 410.

Included in the valve nozzle structure is an automatically operable pressure valve 411, the same being positioned within the unit as a part thereof. This is a standard construction and as previously pointed out insures that no fluid will be discharged from the hose 408 unless the fluid is under predetermined pressure sufficient to open valve 411 and providing further that the valve 409 has been opened by actuation of lever 410. The opposite end of the hose is connected to a discharge line 413 which extends through the housing 400 and is encased as at 412. This discharge line includes the main valve 70 and connects to the meter discharge line 414, see Fig. 2. The meter is supplied with gasoline, for example, by line 416 which communicates with the air eliminator 417 which is supplied with gasoline by line 419 that connects to the pump 418, provided with shaft 420 mounting pulley 421 driven by the belt or like member 422, in turn driven by the pulley 423 mounted on the motor shaft 424, the motor being indicated by numeral 425. The pump suction line 426, see Fig. 2, is adapted normally to extend into and terminate above the bottom of an underground supply or reservoir 99, see Fig. 1, access thereto being had through a fill pipe 98 provided with ears 97 and 96. A threaded closure cap 95 with ears 94 and 93 closes said fill pipe. A lock 92 locks the cap to the fill pipe. A seal 91 together with wires 90 indicates tampering, if attempted.

It is common practice for the hose hanger or support to have juxtapositioned thereto a lever construction which is engaged and actuated by either the nozzle or the handle guard of the nozzle or which may be manually actuated for controlling the motor by controlling one of the electric supply lines to the motor. For clearness, the specific disclosure of this conventional arrangement is omitted in this particular form of the invention. However, in the second embodiment of the invention illustrated in Figs. 15 and 16 especially such modifications of lever construction are illustrated and the connected member is adapted for motor switch operation. The controls illustrated in Figs. 15 and 16 may be utilized in the present embodiment if, as and when desired or may be eliminated, as illustrated in Figs. 1 to 12 inclusive.

As previously pointed out in the brief summary of operation when the motor circuit is closed, the motor 425 operates the pump 418 which supplies fluid, first to the air eliminator 417 and then passes it through the meter 415 which, in turn, discharges through the valve controlled conduit 414—413 including the outlet valve 70, which, when open, permits the fluid to pass through the hose 408 and through the automatic valve 411 and thence through the nozzle valve 409 for discharge from the nozzle structure. Whenever valve 70 or valve 409 is closed and the pump attempts to dispense fluid, the pump builds up pressure in the system which is then valve locked and this pressure automatically opens a bypass valve around the pump so the fluid returns to the underground storage tank with which main suction or supply line 426 communicates or may discharge to that supply line 426 immediately adjacent the pump. In the preferred form the pump unit 418 includes this bypass arrangement included as an element of internal construction so the same is not illustrated in detail herein.

Projecting upwardly from the meter is a shaft construction 427 which, in turn, operates the internal mechanism of the computer which, in turn, is operatively connected to the volume and/or value indicating mechanism 404. Herein, the computer is the primary source of power for actuating the predetermined stop mechanism hereinafter to be described. The power takeoff from the computer is not shown, but it is connected to the variable speed shaft thereof, the definition of which has been previously set forth herein. This is a constantly rotating shaft for any given price. To illuminate the legending of the computing mechanism 404, a light 429 is provided.

As previously set forth, there is a coin controlled switch in the first embodiment of the invention and the circuit wires thereto are included within the conduit 430.

In the first embodiment of the invention, the mechanism 404 indicates gallons and money as actually computed by the actuated mechanism so that the purchaser has a visual indication of the amount of fluid he is receiving for his purchase and the actual cash value thereof, although the mechanism hereinafter to be described is in itself a computing mechanism and of a predetermined stop character, as will be more fully pointed out hereinafter.

Having thus briefly described the general parts of the embodiment shown in Figs. 1 to 12, reference will now be had to Figs. 3 to 12 inclusive and more especially Figs. 3 to 6, wherein there is disclosed the coin operable mechanism and the coin selecting and protecting arrangement specifically included in this invention, but which it is to be understood may be substituted by other equivalent or satisfactory coin mechanisms.

Briefly, this mechanism includes a guard for a shutter which guard is a stationary sizing plate 431 stationarily mounted on the mechanism frame, compare Figs. 7, 8 and 11 with Fig. 12. Such plate has the slots 432 therein, see Fig. 5, arranged to pass three sizes of coins, to-wit: a twenty-five cent piece, a fifty cent piece and one dollar piece. Immediately behind this plate is a shutter 5, see Figs. 3, 7, 8, 11 and 12, and this is suspended from a support 4. Support 4 is elevated when member 20 is elevated by an arm 22 which is actuated by a pin 31 on the element 28. It is to be noted that when the shutter is elevated to the open position upon reconditioning the mechanism to receive a coin, the entire length of the slots in the shutter are not uncovered by the guardplate so that the insertion of a coin in the proper guardplate slot is required to raise slightly said shutter to permit the coin to pass therethrough. The coin slots in the guard and shutter plates register only upon coin passage therethrough. When member 20 is elevated by coin engagement, the catch 22 is released from end 20A and the member 20 drops by gravity. Support 4 in turn supports a common magnet 3 and a magnet retainer 3A. The shutter 5 lies immediately behind guardplate 431 so that upon coin insertion shutter 5 is elevated for release to gravity. Following lowering movement of member 20, support 4 and magnet 3 are positioned for coin selection, support 4 and magnet 3 falling with member 20. Behind this structure is the coin receiving arrangement having the respective parallel slots 1. The coin, upon insertion into the appropriate slot, rolls downwardly in said structure and onto a teeterbar, forming a portion of the bottom of said slot. Bar 2 is pivoted at 2A and counterbalanced as at 2B. This counterbalancing may be of adjustable character, if desired, see holes 2C. When the coin is a proper coin, the magnet is not effective thereon. The non-attracted coin stopped physically by the magnet is on the teeterbar. In the event the coin or slug is not responsive to magnetism, it will, if lighter than the correct coin, roll further on the teeterbar when the magnet is elevated and thus be returned to the ostensible purchaser when the shutter and magnet are elevated. In the event the slug is magnetically attracted, it will be held by the magnet and, therefore, cannot impose its full weight on the teter bar to pass into channel 6. Even if the weight were effective the magnet would hold the slug. Then the magnet elevates this coin until the latter is stripped from the magnet and is returned to the purchaser in the same manner a light coin is returned because the slug drops on the teeterbar and rolls to the purchaser return coin receptacle, not shown.

In the event the coin is not responsive to magnetism and is of proper weight or heavier than that for which the teeterbar is adjusted, the teeterbar, under this weight, tilts to dotted line position, see Fig. 3, and discharges the coin, as indicated at B, into slot 6. The coin then drops on to the anvil 7. If of the proper weight and fineness and therefore a proper coin, the coin bounces from the position C to the position D where it is caught by the grooved portion 8A of the coin carrier member 8 mounted on the shaft 9. In the event the coin is not of the proper character, and has passed the aforesaid protective arrangements, it will not properly bounce and will pass out to the purchaser, the initial passout discharge position being indicated by the letter E, see Fig. 3.

When the coin carrier 8 by handle 33 and shaft 9 is rotated counter-clockwise for dispensing, the coin indicated at D engages the pivoted stop 10 constrained by spring 11. This tiltable member 10 constitutes a stop for insuring proper positioning of the coin in the portion 8A in the event it should bounce more than that necessary to properly seat therein. Note handle rotation clockwise positions the carrier for coin reception and resets the shutter plate, etc.

It is to be observed that each coin denomination has an individual coin carrier mounted on the common shaft 9. The protective mechanism hereinbefore described is substantially duplicated for each coin denomination, although whenever desired certain of these individual mechanisms may be modified, as for example, the anvil 7 and a common member utilized.

After the carrier 8 is rotated counter-clockwise beyond the stop 10, the coin moves to the position indicated at F, see Fig. 4, and in doing so engages the tail 12B of lever member 12 having the upstanding portion 12A and pivoted at 15, the lever moving from the rest or dotted line position, see Fig. 4, to the control or full line position, see same figure, in the counter-clockwise movement of shaft 9.

This lever 12, or rather all the coin levers, are normally constrained to lie against a common stop 17 which may be of individually adjustable character, see bolt 17A. A U-shaped member 13, common to all levers, is mounted on the shaft 16 and includes a bearing portion 13A, common to all coins, and positioned adjacent the division member 14. In Fig. 4, coins G and H illustrate the coin directing (division) function of member 14. When the coin has tilted associated lever 12, a certain setup or conditioning of predetermined stop character is imposed upon the pump control mechanism hereinafter to be described.

The coin, in the continued counter-clockwise movement of the carrier 8, see Fig. 4, then drops down and rests on the bearing 13A just described because the portion 12C of lever 12 has engaged the portion 13C of the member 13 and has tilted the same counter-clockwise. The coin then can take either of two directions. Whenever the shaft 9 is rotated clockwise when the lever 12 is in the selecting position, as when the purchaser changes his mind and desires return of the coin or there is no liquid in the underground storage tank to dispense, the coin upon sufficient clockwise return rotation of shaft 9 as aforesaid then will roll to the right of and upon the division member 14 as indicated at H because the carrier 8 has lost control of the coin, the carrier being relieved at 8B for such coin movement, and the coin will be returned to the ostensible purchaser. This is a condition only occurring as will be hereinafter pointed out when fluid is not dispensed through the outlet valve 70. After fluid dispensing has once started through the outlet valve, this coin release and return cannot be effected and the coin will be diverted to the money box.

The normal operation is as follows: continued movement of the shaft 9 counter-clockwise previous to the coin resting on 13A conditions the motor switch through the lever 12 and the shaft 16. Note shaft 16 mounts lever 13, see Fig. 6, and also mounts arm 36 connected by link 37 to the switch conditioning means, see Fig. 8. After further counter-clockwise movement of shaft 9, the coin rests on stop 13A and remains in that position until the dispensing operation is completed. Thereupon the coin, when the indicator 12, which is a volume selecting member, is released, passes to the left of the division plate 14, as indicated at G, see Fig. 4, and passes to a coin box. Note when lever 12 is released from the full line position, Fig. 4, to the dotted line position the lower weighted end of lever 12 prevents upward movement of the coin and so prevents discharge thereof to the right of division plate 14 and return of the coin to the purchaser. The weight of member 13 and the coin causes lever 13 to tilt clockwise to dotted line position, see Fig. 4, so that the coin can be discharged to the coin box, not shown. At the same time, the motor switch conditioning mechanism returns to the open circuit position condition.

Outside of the coin channels and on the cover plate, there is mounted on the shaft 24 an arm 22, see Fig. 6, having a latch portion 22B at one end and a tail 22A extending oppositely therefrom, the same being adapted for engagement by a pin 31, see Fig. 12, carried by a gear 28 on shaft 9, see Fig. 7, and movable with the handle 33.

This member 22, see Figs. 6 and 12, when the handle 33 is rotated clockwise, which is the conditioning operation, engages portion 20A of member 20 and elevates the shutter 5 and magnet 3 for stripping action, et cetera, previously described and conditions the coin receiving construction for the reception of an additional coin. Note Fig. 15 illustrates the connection between the shutter and magnet.

It will be noted that the member 20 slidable in guide 20B mounts at its lower end pin 21 which is operatively associated with the arm 23A pivoted at 25, see Figs. 6, 7, 8, 11 and 12. The arm 23B projects somewhat angularly therefrom and has a notched end 23B', see Fig. 11. The arm 23 also integral with portions 23A and 23B extends outwardly and constitutes a counterweight to normally constrain member 23 and its arms 23A and 23B clockwise into engagement with the pin 21. The proper functioning of the notch 23B' will be hereinafter set forth more fully.

It is to be observed that insertion of a coin elevates the shutter 5 beforementioned and the magnet 3 a slight amount but not to the degree previously mentioned for magnet stripping. This elevation, for example $\frac{1}{16}''$, is sufficient to release the latch arrangement 22B—20A, see Fig. 6, dotted lines, so that the lever 22 and its tail portion 22A drops clockwise into the released position, see Fig. 6, full lines and detached and spaced from the portion 20A. When pin 31 engages tail 22A in the conditioning operation, lever 22 tilts counter-clockwise and portion 22B locks member 20 in elevated position, see dotted lines Fig. 6.

Mounted on the shaft 9 is the gear plate 28 beforementioned having the pin 31 beforementioned on one face thereof. This gear 28 is of segmental character, the teeth omitted portion being indicated by 28B, see Figs. 7, 8 and 12, and the teeth thereon being indicated by 28A. This gear plate carries on its front face the member 30, see Fig. 9.

Behind the gear plate 28 and mounted on the frame or cover plate is a bracket 27, see Figs. 8 and 11, to which is secured a spring 26 having a curved portion 26B and a curved free end 26A. In the clockwise rotation of plate 28 by means of handle 33, the pin 31 engages the portion 26A and forces the spring 26 to the right until the pin seats in the curved portion 26B. Said spring thereupon holds the pin 31 in this position and the handle and the gear. This is the starting or coin receiving position. This latch is of yielding character.

When the member 20, see Fig. 7, shutter 5 and magnet 3, see Fig. 3, are elevated, pin 21 moves upward and the weighted member 23 moves clockwise throwing the arm 23B, compare Figs. 7, 8 and 11 with Fig. 12, into juxtaposition with reference to the seat 26B of spring 26 and thus into locking engagement for the pin 31, because the spring seat 26B and arm 23B are in tandem relation relative to each other. This tandem engagement positively locks the entire mechanism against any motion, clockwise or counter-clockwise, until a coin has been inserted. Coin deposition releases latch 22B—20A and permits the pin 21 to slide down along the surface of 23A to turn the member 23A in opposition to its constraint (weight) counter-clockwise to release by portion 23B′ the positive lock on pin 31, see Fig. 12, thus freeing the handle 33 and shaft 9 for subsequent movement counter-clockwise from yielding latch 26B. When this condition is effected, the coin which has been responsible therefor is resting, if a proper one, and not otherwise rejected, on the carrier 8.

If, for any reason, the coin has been rejected by the mechanism, and this includes slugs as well, it is necessary to move the handle counter-clockwise until the pin 31 moves past the member or tail portion 22A. This positions pin 31 to the left of tail 22A. After this has been effected the handle 33 is reversed or moved clockwise, the pin 31 then picking up the tail portion 22A and reestablishing the locking relation previously described with reference to parts 22B and 23A and reconditioning the coin receiving mechanism for coin reception. This permits the member 23 to move to the locking position so that when the pin 31 is again brought back for spring 26 engagement, it will be latched in the spring seated position at 26B, as previously described. This operation is repeated as often as a rejected coin or slug is utilized. When the proper coin is inserted, however, the mechanism is released and conditioned for the subsequent actions, movements and relationships, as previously described, in connection with the movement of the coin carrier from its coin receiving position counter-clockwise to its value or volume selecting position and its switch conditioning position.

In this movement from the coin receiving position of the coin carrier 8 to the positions last mentioned, see Figs. 4 and 6, that is, value or volume selection and switch conditioning, the pin 31 engages the lever 44 pivoted at 44C, see Figs. 8, 10 and 11. This engagement is continued in the counter-clockwise movement of the pin 31 and this engagement in said movement of the pin gradually tilts the lever 44 clockwise on its pivot. This movement lowers the upper latching end 44B.

Coaxial with drive shaft 49 above shaft 9, see Figs. 7 to 12 inclusive, is a gear 47, see Figs. 2, 7, 9 and 12, adapted to mesh with the gear 28. This gear 47 floats on shaft 49 and mounts on its face a stop 47B, see Figs. 7, 9 and 12, in the form of a pin. This gear 47 is of segmental character having the teeth 47A and the tooth omitted portion 47C, the teeth 47A being meshable with the teeth 28A of the gear 28 under proper conditions. The gear 47 is rotatably supported on the shaft 49. Gear plate 47 has secured to it, the lock or catch portion 58, shown dotted, see Fig. 7. In the rotation, counter-clockwise, of handle 33, the pin 31, as stated, tilts the member 44 and in so doing, the latch portion 44B of member 44 is moved downwardly, and out of the notch or recess 58A of said catch 58, see Fig. 7. This frees the gear 47 so that it can move in a counter-clockwise direction, as hereinafter set forth more fully. The locked position of gear 47 is in zero position.

It is to be understood that gear 28 mounts a lug 29, see Fig. 11. In the continued counter-clockwise movement of the handle 33 in the initial manual operation for conditioning the mechanism to dispense fluid, the lug 29 carried by the gear 28, engages the upper end of the plunger 80, see Figs. 8, 10 and 11, and depresses the same, this plunger being normally constrained into its elevated position by spring means not shown and being slidably supported in the guide 81 carried by the switch box 41. The lug or member 29 is carried on the same side of the plate 28 as the pin 31. Plunger 80, compare Figs. 10 and 11, serves as a circuit closer for the motor circuit.

Reference will now be had to Figs. 2 and 7 to 12 inclusive, wherein this switch box and its included mechanism and the associated control mechanism is fully illustrated.

In said figures, it will be noted that lever 36 is secured to the exposed end of shaft 16 and connected to the free end of said lever 36 is the link 37 which extends downwardly toward the switch box or housing 41 and pivotally connects to one end of lever 35 secured to the shaft 19 exteriorly of the housing 41. Shaft 19 within the housing has secured to it the lever 38, see Figs. 8, 10 and 11, which pivotally supports at its free end the switch carrier 39. This switch carrier 39 supports the mercury switch 40. Lever 38, lever 35 and lever 36 and lever 13, accordingly all have exactly the same motion.

It will be noted that within the housing 41 is the inclined support 42. By referring more particularly to Figs. 8 and 10, it will be observed that the switch carrier 39 is in the open circuit condition position and that the switch is in the open circuit position in Fig. 8. In Fig. 10 the switch carrier 39 is in the position wherein the circuit may be closed or closed circuit condition position but the switch is still in the position wherein the circuit is open or open circuit position while in Fig. 11 the switch carrier is in the closed circuit condition position and the switch and carrier have been actuated and moved by the plunger 80 into the closed circuit position. In other words, the support and the switch carrier 39 are connected together and are raised by the lever 38 first to the position of Fig. 10 from that of Fig. 8 and thereafter the plunger 80 when actuated swings the carrier and support about the pivot 38A relative to lever 38 to the position of Fig. 11.

It will be remembered that when the coin on the carrier 8 has been moved to position F the lever 13 has been tilted counter-clockwise and with it the shaft 16. Lever arm 36, see Figs. 7 to 11 inclusive, is thus moved upwardly together with link 37 and exterior lever 35 as well as interior lever 38 on shaft 19. This movement corresponds to the movement of the switch carrier 39 from the position shown in Fig. 8 to the position shown in Figs. 9, 10 and 11. It will be remembered that abutment 29 on gear 28 upon engaging plunger 80 depresses the latter and upon such depression the lower end of the plunger 80 engages the switch carrier 39 and tilts it clockwise on the pivot 38A so that the mercury switch 40 is positioned to complete the motor circuit therethrough.

When the value and/or volume selecting lever 12 is released to non-selecting or zero position, following completion of dispensing of the predetermined volume of fluid, lever 13 moves therewith by gravity, rocking the shaft 16 clockwise, which moves the switch carrier 39 from the position shown in Fig. 11—and the switch shown therein—to the position shown in Fig. 8 as previously described.

Actuation of the handle 33 and subsequent engagement of the plunger 80 by the abutment 29 in said handle actuation, if that be attempted, thus is not effective for closing the switch controlled motor circuit so that the cycle of operations cannot be duplicated without including the insertion of a coin, in other words the complete cycle must be fully performed.

Referring more particularly to Fig. 2 and Figs. 7 to 12 inclusive, it will be noted that the exposed end of the shaft 19 which projects from the switch housing 41 mounts the aforesaid lever 35, to which also is connected at 34B an arm 34 having a lateral extension 34A, the same having a counterweight function. This arm 34, at its upper end includes a notch 34C. This arm is slidably supported in the guide 45C carried by the member 45. The member 45 mounts a pair of pins 45A and 45B, these being in spaced relation. The member 45 is pivoted to the frame as at 46 and includes a cutaway portion 45E to give clearance to the pin or stop 47B, carried by the segmental gear 47, as previously described. Adjacent the relieved portion 45E is the catch portion 45D. It will be observed, see Figs. 7 and 9, that the projection 30A of member 30 carried by the segmental gear 28 is adapted to engage in the notch portion 45D upon proper positioning of these two relatively movable parts and such engagement will be hereinafter referred to more fully.

The segmental gear 47, see Fig. 7, previously described as having a segment of the teeth removed and as freely floating on the shaft 49, mounts on its face a series of pawls 48, the same being pivoted thereto as at 48A and having the tooth portions 48B adapted to engage ratchet gear 51. The pawls are constrained into ratchet engagement by suitable spring means herein illustrated as an endless helically coiled spring 50 encircling all pawls. The ratchet gear 51 is rigid with the shaft 49. This pawl and ratchet connection will permit relative movement between the gear 47 and the ratchet 51 (and shaft 49 rigid therewith) in one direction and in the reverse direction of rotation the ratchet and shaft and gear move together as a unit.

It is to be particularly emphasized at this point that this shaft 49 is the power shaft of the predetermined stop mechanism and it is driven by the so-called "variable speed" shaft of the computer mechanism, variable strokemeter or a meter of a constant measuring type.

Shaft 49 is directly connected to and operable by the meter etc. and only when the latter is operating. Since ratchet 51 is rigid with shaft 49 when the latter rotates counterclockwise ratchet 51 through pawls 48 rotates segment gear 47 counterclockwise. It is also true that gear 47 through gear 28 when the respective teeth mesh can be rotated counterclockwise without any rotation being imparted to ratchet 51 and shaft 49. When gear 28 is rotated in a direction that normally would result in ratchet 51 and shaft 49 being rotated clockwise, same does not occur because at this time the teeth on the adjacent gears do not mesh. Accordingly, actuation of gear 47 by the gear 28 is for setting up purposes and actuation of gear 47 by ratchet 51 (and shaft 49) is for measuring purposes and when the measured amount is dispensed the effective tripping pin on gear 47 trips the appropriate latch 18 to release member 12 and permit outlet valve closing and switch movement and opening.

Shaft 49 always rotates in the counter-clockwise direction so that the preceding reference in connection with relatively free movement of one part with respect to the other in effect is the equivalent of a statement that the gear 47 may be rotated counter-clockwise independently of the ratchet 51 but not rotated independently thereof in the reverse direction. Also, the gear 47 will always rotate counter-clockwise when the ratchet 51 is rotated counter-clockwise incident to the dispensing of fluid.

It will be remembered that the rearward face of the segmental gear 47 mounts the catch 58, see Fig. 7, having the notch 58A therein. This notch is the zero position of the gear 47 when it is locked by the tail portion 44B of the pivoted member 44 actuated by the pin 31 in turn carried by the segmental gear plate 28, as previously described. Gear 47, therefore, is locked in the zero position until it is unlocked by the tilting of the lever 44, as previously described.

*Adjustable unit volume-price mechanism*

Adjacent and behind the gear 47 and freely floating on the shaft 49 is the plate or disk 52, see Figs. 13 and 14. Plate 52 is shown provided with a plurality of elongated slots 56, see Fig. 14, and seated therein are the studs 57, carried by the adjacent plate-like gear 47. This plate 52 thus can be shifted annularly relative to the gear plate 47 and therefore also relative to the zero point. This shifting arrangement is provided to facilitate the accurate adjustment of the mechanism to the predetermined zero point. The plate 52 is relieved, as shown in Fig. 14, at 52A to provide space for the mounting of the catch member 58 on the back face of segmental gear 47 and also to provide clearance for the catch 44B, previously described.

In suitably spaced and arcuate relation, and projecting rearwardly from the plate 52 are a plurality of tubular sockets and these are indicated by the numerals 53A, 54A and 55A, respectively. Slidably mounted in each of these sockets is a stop pin 53, 54 and 55, respectively. The extended position of each is adjusted by suitable means not shown herein. Each of these pin members is arranged in offset relation with respect to the effective length or rather the free end thereof for a purpose hereinafter to be described.

Stop pin 53 terminates closer to plate 52 than stop pin 54 and these two terminate closer to the plate 52 than stop pin 55. It is to be understood that herein three actuating members are provided, each to be operatively associated with the proper one of the three projecting pins. These pins are so positioned relative to parallel planes that but one is effective, same being determinable by the coin selection as hereinafter more fully set forth and more particularly in connection with the outlet valve mechanism, parts of which have been previously described rather briefly.

The longer pin 55 is the dollar pin. The intermediate length pin 54 is the half dollar pin and the shorter pin 53 is the quarter pin. In the rotation of the segmental gear 47, clockwise as shown in Fig. 14, and in the counter-clockwise direction in the other figures beforementioned, pin 53 will pass by the dollar selected lever and so will the pin 54, but the pin 55 will not so pass, but will engage the same and effect the proper control hereinafter to be described. In like manner, if a half dollar coin has been utilized, pin 53 will pass the twenty-five cent controlling member and pin 54 will engage the half dollar controlling member, these controlling members being similar, to thus effect the proper control. When a quarter has been deposited in the device, the counter-clockwise rotation of the gear 47 effects engagement between the pin 53 and the quarter determining control member.

The spacing of these pins arcuately is such that the movement is in the ratio of 1, 2 and 4 so that the volumes dispensed are in the ratio of 1, 2 and 4. While but three pins have been disclosed herein, a greater or lesser number may be employed, depending upon whether a greater or lesser number of coins is utilized respectively. In that event, a greater or lesser number of pins also are utilized, a greater or lesser number of coin carrier members 8 also will be utilized and a greater or lesser number of coin operable predetermined stop selecting or indicating members 12, et cetera, will be utilized, respectively. These additional or lesser pins may be spaced in such relation to each other so as to give any desired volume ratio.

By means of the slots 56, see Fig. 14, and the boltable connections 57, the proper relationship or predetermined positioning of the predetermined stop mechanism pins is adjusted with respect to the zero point represented by the notch 58A in the member 58. When properly adjusted, of course, plate 52 and the segmental gear 47 are utilized and the resulting unit freely floats or rotates on the shaft 49 driven as stated by any one of the several power means, previously described and by a connection therebetween not disclosed herein for simplicity. Any desired convenient connection may be employed in each instance.

Rigid with the shaft 9, as by being secured to the gear 28, is a sheave wheel 32 having a groove 9A, see Figs. 7, 9 and 12, and secured thereto is one end of a cable 74, the cable wrapping around the wheel. This cable 74 extends from the wheel and passes over two angularly positioned sheave wheels 72 and 73, the same being direction changing wheels. The cable 74 at its other end is connected to the setback mechanism 9A, see Figs. 7 and 12, and more particularly Figs. 12—A, 12—B and 12—C for setting back a computer of the Veeder-Root type to zero after it has once been operated. This cable also is employed with the variable strokemeter mechanism shown in the copending application referred to hereinbefore which mechanism, after the latter is utilized, returns the gallonage recorder or indicator to the zero position. No further description or illustration thereof in view of said application disclosure and the designated figures above is believed necessary.

By this means the recording or legending mechanisms of the dispersing pump unit and the actuating mechanisms for such mechanisms is each returned to zero simultaneously. The specific mechanism in such return mechanism will be found in Figs. 12—A, 12—B and 12—C.

In Figs. 12—A, 12—B and 12—C, drum 700 includes the external spiral groove 701 and counterbore or recess 703, see Figs. 12—A and 12—B. The spiral spring 704 located therein, see Fig. 12—B, and omitted for clearness in Fig. 12—A, has one end secured to the drum 700 as at 705 and the other end is secured to stationary bracket 113 at post 707. This bracket also serves as an outer bearing for setback shaft 714. The setback cable 74 seated in the groove of and wound about the drum insures spring winding or loading when the drum 700 is rotated by the cable in unwinding therefrom. The face of the drum, opposite the counterbore, supports a stud or pin 708. Pivoted thereon is pawl 709 to which is secured one end of a spring 710.

Mounted on and secured to setback shaft 714 adjacent drum 700 is member 711 provided with a spring actuating extension 712 and a latch portion 711A. The setback shaft of the computer may rotate clockwise or anti-clockwise during dispensing, depending upon the side of the computer which is to be utilized for setback, consequently the assembly of the pawl and latch together with the spring 704 must be in accordance with the clockwise or anti-clockwise rotation of the setback shaft of the computer itself.

When the computer moves from the zero position by meter actuation, as previously described, the setback shaft 714 remains in a fixed position due to the clutch arrangement inside the computer, so that a single rotation of the setback shaft will insure return of the entire computer to zero.

It is to be noted that when a Veeder-Root computer is set back to zero by means of the setback shaft, upon completion of the cycle, the setback shaft, when released from constraint, will move counter to the setback direction a few degrees. This movement permits the free end 710A of the spring 710 which has just passed beyond the end of the extended portion of 712 to drop below the extended portion end due to the weight of the pawl 709 dropping out of engagement with catch 711 at 711A, as shown by the dotted lines in Fig. 12—C.

It is to be noted that the pawl 709 would be held in engagement even though the end 710A of the spring 710 had passed member 712 until the propelling force of the drum 700 had ceased. The normal position of the pawl and drum is as shown by full lines in Fig. 12—C.

When the actual operation of setting back the computer is undertaken, the drum is rotated clockwise, see Fig. 12—C, and as the free end 710A of spring 710 passes over spring actuating means 712, the latter forces the pawl 709 into engagement with the latch portion 711 at 711A, as shown by full lines in Fig. 12—C. The continued rotation of the drum 700 clockwise will carry the setback shaft 714 with it to the zero position in which the entire computing mechanism is cleared to zero and starting position.

It will be noted that a cable and pulleys of exactly the proper relationship must be used in order to accomplish the definite result required by a mechanical setback mechanism. The free end of spring 710, see Fig. 12—C, in connection with the actuating member 712 insures release of the spring at the proper instant and the prevention of the pawl 709 fouling the portion 711 in the counter-clockwise movement of the setback shaft as explained above. This particular setback feature is necessary for the accomplishment of a simultaneous setback of the computing mechanism at the same time that the pump is reconditioned to receive a coin. Without this or an equivalent device, it would be impossible to open the shutter 5 adjacent the coin slots in plate 431 for coin reception without making a full cycle of manual lever handle 33, for if it were otherwise attempted, the pawl 709 would pick up the setback shaft 714 and only partially move the conventional computer shutter or shutters, not otherwise mentioned hereinbefore or disclosed, and on the computing mechanism. This would leave the computer shutters closed when the remainder of the mechanism would otherwise be in operating condition which, of course, would defeat the purpose of the visual indication of the amount and cost of the liquid dispensed.

The object of this part of the invention is to synchronize all operations so that they can be simultaneously performed by one lever 33. The operation and function of the coin shutter, see Fig. 3, which closes or opens the coin slots has been explained in detail. The register or indicating mechanism such as Veeder-Root, etc., is a standard device equipped with shutters which cover the price and volume indicating means during the process of setting the device back to zero. This mechanism is so constructed that when it is returned to the zero position, the setback shaft thereof has a back lash of about 1/16 of a turn of the shaft.

In order to set the indicating or recording means back to zero simultaneously with the setting of the coin mechanism back to zero or coin receiving position, there must be provided a device that will permit the indicating or registering device setback to have the predetermined back lash before the shutters of the computer or registering means open. This is accomplished by the device shown in Figs. 12—A, 12—B and 12—C.

From the previous description it is evident that coin shutter 5 is controlled entirely by the pin 31, lever 22 and member 20, etc., and release is accomplished by means of a coin, while in the case of the setback mechanism for the register or indicating means, this is accomplished thru cable 74 which is attached to pulley 32 mounted on gear segment 28, the other end of the cable being wound around and attached to drum 700 as shown in Fig. 12—A. Drum 700 floats on shaft 714 but is secured to the bracket 713 by means of a spring 704 which is secured to the drum at 705, on the opposite side of drum 700, see Fig. 12—C, which shows the pin 708 which carries catch 709 which has spring 710 secured to it. This spring has the free end 710A. Segment 711 is secured to the shaft 714 and has the latch portion 711A and the spring actuating guide and release 712. The free end of this spring rides over the portion 712 holding the latch in engagement with 711, but upon any attempt at reverse motion the end of the spring 710A drops down clear of 712, and by following the periphery of 712 is kept from fouling portion 712 and at the same time permits pawl 709 to drop by gravity out of engagement with portion 711. It is the contour of portion 712 that permits of this spring action. This device makes possible a partial movement of operating lever 33 to reopen the coin shutter 5 after a coin has been rejected without interfering with the zero or starting position of the computer or recording device.

Referring to Fig. 2 and Figs. 7 to 12 inclusive especially, it will be understood that 70 indicates a spring loaded poppet valve in the dispensing or discharge line 413, this being the outlet valve previously mentioned. This normally closed valve, as previously described, is interposed between the hose and the meter or other fluid measuring means. The valve shaft 70A mounts a lever arm 69, the free end of which is pivotally connected at 68A, see Figs. 9 and 10, to link 68 which is pivoted at 65 to lever 66 pivoted to the frame mechanism at 67. Also pivoted to the member 66 at 61B is a depending member 61 having shoulder 61A. This member 61 has curved face 61C which normally bears against the pin 62, see Fig. 11, and for this purpose because lever 61 is moved linearly, as hereinafter set forth spring 61D is provided. The bearing face 61C is of arcuate outline. The upper end of this bearing portion projects laterally forming the shoulder or stop 61A which is adapted to be engaged by the pin 31 in the counter-clockwise movement of the handle 33. Pin 62 is stationary so that in lowering movement of member 61, the lower end has predetermined lateral movement.

Pivoted at 64, see Figs. 7, 8, 11 and 12, is a gravity constrained latch 63 having the latching portion 63B, see Fig. 7, and the lateral projecting or tail portion 63A. In the counter-clockwise movement of the gear 28 and the handle 33, the pin 31 engages lever 61 by engaging shoulder 61A thereof. Continued counter-clockwise handle movement pulls down on the lever 61. The cam face 61C of said lever 61 thereupon slides on the pin 62, previously described, and downwardly. This face and this pin constitute a cam arrangement so that in the continued counter-clockwise movement of the pin 31, the lever 61 is not only carried downwardly but is moved laterally or to the left until such time as the shoulder 61A escapes from the pin 31 and thus effects disengagement between the pin 31 and lever 61. Just prior to this disengagement, the latch 63 drops into place above the member 66 and latching portion 63B thereof, see Fig. 11, becomes effective for holding the member 66 in open valve position and then the members 68 and 69 are held against the upward movement incident to valve constraint. In this position, the valve 70 is in the open position for the dispensing of the liquid purchased.

It is to be observed by way of explanation and to facilitate a correct understanding of the mechanism and its operation that the engagement of the pin 31 with the shoulder 61A occurs after the coin selected indicator member 12 has engaged a lock latch 18, see Figs. 3 and 6 to 12 inclusive, which latch is pivoted at 18A on the mechanism frame adjacent member 12 and includes the locking shoulder 18B and the riding face 18C. Therefore, latch 63 becomes effective, dropping into place as described, only after the indicator member 12 has been secured in the conditioning and controlling position. Thus the extension 63A of the latch 63 lies directly above the latch 18, as shown in Fig. 11. Note that extension 63A is wide enough to overlie all latches 18 of which three are shown, so that any latch 18 can actuate member 63A for releasing the lever system so valve 70 can close under its constraint. This time latch, it will be recalled, is actuated by its associated member 12 in the initial "setting up" or "volume selecting" action thereof. Note that spring 56 constrains latch 18 in the counter-clockwise tilted position.

Since the valve 70 is opened by pulling down on bar 61, through pin 31 and shoulder 61A and the valve is constrained to closed position which corresponds to when link 68 is elevated and also lever 66 elevated, see Fig. 7, such pulling down by bar 61 lowers pivot 65 from valve closed to valve open position. Gravity latch 63 with notch 63B rides the inwardly projecting extension of pivot 65 until the latch has dropped sufficiently, with lowering of bar 61, to hold all the aforesaid members against elevation due to the valve constraint.

Previously, it will be recalled, selected latch 18 has been set up by lever 12 and latched in dispensing position. It (member 18) underlies tail 63A at all times. However, when the selected latch 18 is actuated, following dispensing of the predetermined amount of liquid, it engages the underface of tail 63A, as illustrated in Fig. 12, whereupon latch 63 is tilted counter-clockwise upon its pivot 64 to disengage locking portion 63B from pivot 65. This releases the outlet valve from its latch constraint and it is forthwith closed and the members 68 and 61 are elevated thereby and lever 66 rotates counter-clockwise, pivot 65 then riding on the lower face of latch 63, since it is gravity constrained. In effect, this latch locks up slightly overcenter, hence it is self sustained until released by a member 18.

When the valve 70 is in the locked open position, the coin carrier 8 has forced the coin selected indicating member 12 into the controlling position when the latch 18 holds said lever 12 in said selected position, since spring 56, see Fig. 8, insures quick action of the latch in its movement into locking position. The tilting of said latch by the selected member 12 is in opposition to this spring.

When the hand operated lever 33 has been moved to the extreme limit of its anti-clockwise position, the circuit through the motor is closed through the mercury switch provided the hose hanger switch, hereinafter to be described, if utilized, is also closed. Motor actuation operates the pumping unit. The fluid pumped thereby, if the hand controlled valve at the nozzle is open, flows through the variable strokemeter or flows through the meter used in connection with the Wayne Variator. The "variable speed" shaft of either of these devices at the time of fluid flow operates shaft 49 and rotates the same, together with the ratchet gear 51 secured thereto as previously described and proportional to fluid dispensing flow.

It is again stressed that valve 70 is a normally closed valve and is constrained to the closed position by spring tension externally or internally applied and the actuating means for opening the valve is of mechanical type and automatic in action and the means for closing the valve is of mechanical type and automatic in its action of release, the valve closing by reason of the constraint.

The gear 47, by means of the pawls 48, also rotates with the ratchet gear 51. Upon the predetermined amount of fluid being dispensed, determinable by the selected pin 53—54—55 engaging its associated member, said pin moves into engagement with the lock latch 18 of which there are a number corresponding to the number of pins employed. Each lock latch 18 is associated with the respective coin operable or selected indicating member 12 as previously described.

All of the lock latches are mounted on the common shaft 18A and each is constrained by an independent spring 56. It is hereby noted that the lock latch 18 has the portion 18D projecting into the path of the pins previously mentioned and it provides the shoulder face 18E and the inclined opposite face 18F.

It will be remembered that upon coin actuation, the upper end of the coin selected lever 12 engages the cam face 18C of the corresponding latch 18 and tilts the same clockwise in opposition to the individual spring 56 associated therewith until the upper end of said coin selected lever 12 is trapped and caught by the shoulder 18B of the latch 18. Then in the counter-clockwise movement of the gear 47, the corresponding pin is arranged to engage upon the face 18E of said latch 18 and tilt said latch lever clockwise upon the pivot 18A to release said lever 12 and the latch 18 simultaneously engages the portion 63A of the latch 63 to elevate the same. In this tilting movement, the coin selected lever, released from the shoulder 18B, tilts counter-clockwise and returns by gravity to the non-selecting position, which also is the non-indicating position. Also, as previously set forth, simultaneously with the clockwise tilting of the selected lock latch 18 by the coin corresponding pin 53—53A, 54—54A, or 55—55A, see Fig. 14, the latch 63, through the projection 63A, which overlies all lock latches, is tilted counter-clockwise to release lever 66 and link 68 from their elevated or open valve position, so that the aforesaid portions return to the original zero or closed valve position by the outlet valve constraint.

Accordingly, upon release of any previously actuated lock latch 18 through counter-clockwise movement of the measuring wheel 47, the outlet valve control mechanism is released so that this valve 70 can instantly close because it is of the spring loaded type and has been held open solely by reason of the latch 63 at 63B.

Simultaneously with the closing of the valve, the coin selected member 12, as previously set forth, drops by gravity and moves counter-clockwise about its pivot point 15 to zero position which movement permits switch actuating lever 13, mounted on shaft 16, to seek, see Fig. 8, the open circuit condition position, the switch carrier 39 then coming to rest on the inclined portion 42 of the switch box 41.

When this occurs, the coin moves from a position wherein it has been retained or trapped, this being the intermediate position between positions G and F, to the position indicated at G and to the left of the partition member 14 for discharge to a coin box, not shown.

When the motor circuit is once closed and the delivery of fluid is started, the gear 47 moves counter-clockwise. The pin or stop 47B, see Fig. 7, previously described and mounted on said gear 47 also moves into engagement with the gear lock 45 pivoted at 46.

This gear lock is provided with the pins 45A and 45B and the guide 45C for member 34. The instant the segmental gear 47 makes the slightest counter-clockwise movement—and this occurs instantaneously with the dispensing flow of fluid as previously set forth—the pin 47B tilts the lever lock 45 clockwise about the pivot 46. The slightest movement of the gear member 47 thus positions the latch portion 45D so that it is conditioned to engage the portion 30A of the member 30 when the latter is presented thereto, member 30 being mounted on the segmental gear 28. Such catch and latch engagement prevents rotation of the gear 28 while permitting proper rotation of gear 47.

Member 34, it will be remembered, is elevated whenever the selected coin has engaged the selected indicating member 12 and has tilted the latter into the locked position, same being retained therein by the appropriate lock latch 18. This member 34 has the notch 34C. This notch, in this conditioning or selecting movement slides past the pin 45A on the tiltable lever lock 45 and remains in this position until the pin 47B carried by the segmental gear 47 tilts this gear lock 45 clockwise on pivot 46. This clockwise movement of gear lock 45 permits the pin 45A to then engage or seat in the notch 34C in the member 34 to hold it in this position which is the locked position. This member 34 is held in this locked position until the lever 35 and its power member 13, shaft 16, member 36 and link 37 are returned to the original conditioning position as shown in Fig. 8. When the notch 34C is released from the pin 45A, the tiltable member or lock 45 seeks its original position by gravity and unlocks the gear 28 for operation, that is, permits manual manipulation to initiate a new cycle or dispensing operation.

When the coin, as previously described, has been released to the money box and after the completion of a dispensing operation, this gear 28 is thus released from its constraint and lock. It is then necessary to move this gear 28 by moving handle 33 in a clockwise direction which, as previously described, conditions the mechanism associated with the coin carrier 8, et cetera, into coin receiving position.

During the operation of liquid dispensing, it will be remembered that the segmental gear 47 through the variable speed shaft 49 has been rotated counterclockwise to a given tripping position. Gear 47 is then rotated to an extent such that the latch tripping pin thereon, when gear 47 is rotated by shaft 49 trips latch 18, etc. The extent of the aforesaid rotation by gear 47 is determined by the coin utilized. Referring to Fig. 7 it will be noted that herein the teeth of gear 28 do not now mesh with those of gear 47 at all because gear 47 has the gap 47c in its rim. Teeth of gear 28 initially rotate gear 47 counterclockwise until the gap 47c aforesaid is "tangential" to the pitch circle of gear 28 whereupon the teeth of the gear 28 are free from engagement with the teeth of gear 47 as the gear 28 continues rotation clockwise to its zero position. Gear 28 carrying pin 31, during its clockwise movement has released the locking member 44 as previously described. The spring tension applied by the spring 56A, then places the latch portion 44B of arcuate lock 44 in position so that it will engage member 58 and seat in recess 58A thereof and thus lock the gear 47 at the zero point.

This movement, when this locking of gear 47 has been effected, it will be observed, positions the toothless portion 47C of gear 47 so that the teeth of gear 28 will not be engaged, see Fig. 7. The gear 28 then is free of the gear 47 and the gear 28 may be moved relative to the gear 47 without effecting rotation thereof or vice versa. Free movement of gear 47 in a counter-clockwise direction may be effected at any time when the gear 28 is in that position corresponding to the position when the motor switch is closed, this position being illustrated in Figs. 11 and 15.

In the event that coin carrier 8, with the coin, has moved the corresponding indicating member 12 to the position where it has been engaged and locked in the indicating and selecting position by the lock latch 18 and if for any reason, there is no current available to operate the motor or there is no fluid in the reservoir, it will be obvious that the gear 47 will not be rotated counter-colckwise and therefore move from its zero position, there being no fluid flowing for providing the power for such movement. This being true, the operating lever 33 with the coin carrier 8 after being rotated in a clockwise direction will release the coin so that it rolls from its position resting on the bearing 13A on the switch actuating lever 13 down the division stop 14 and to the right, as indicated by the letter H and into the chute communicating therewith for returning the coin to the depositor and potential purchaser.

The movement of the manual control member 33 clockwise for the return of the coin to the purchaser under the conditions last described carries the gear 28 clockwise and also pin 31 clockwise and this pin engages the tail portion 22A of the lock 22 raising the same until the latch 22B—20A is effected which, in turn, elevates member 20, et cetera, as previously described. This engagement is effected upon an extended portion 59B of a member 59, see Figs. 15, 7, 8, 11 and 12. The opposite portion 59A, see Fig. 15, of the member 59 is a lateral projection and contacts the coin selected, cocked locking latch 18 and such engagement is the equivalent of the engagement thereof by the appropriate pin 53—54—55 to effect the release from the lock latch 18 of the member 12 and to elevate the gravity operable lock 63. This elevation of the gravity lock 63, assisted by the spring force inherent in the valve 70, permits automatic closing of said valve 70 and at the same time the tilting of the coin selected lock latch 18 releases the coin selected indicating member 12 so that it returns to its original, non-setting or non-indicating position. Simultaneously therewith, as previously described, the motor switch mechanism is returned to the position shown in Fig. 8.

When all of this has occurred, the entire mechanism is conditioned so that it is inoperative, unless and until another coin is inserted and the cycle or sequence of operations originally described has been effected.

It will be remembered that all of the functioning mechanism of this device is mounted on a frame as shown in Fig. 6. Stud 60 is mounted in frame 1000 in the proper relation to stud 18A and mounted thereon is the lever 59 with the right angular portion 59a and the extension 59b as shown in Fig. 15. In order to properly understand the return of a coin to the purchaser due to lack of gasoline or current, it becomes necessary to recondition the machine in its entirety. It has been shown that lock latch 18 performs the function of locking the volume selecting lever in position and at the same time is in a position to allow the outlet valve to close. In order to return the coin to the depositor, lever 12 must remain in its locked position until the coin has been returned. At this particular instant we find the valve locked open and indicating means locked in position, and the coin slots closed, so at the instant of return of the coin it becomes necessary to unlock all the rest of the mechanisms, so as pin 31 engages 22 at 22A to raise the shutter 5 and magnet, the magnet carrier against which is resting 59B immediately forces 59 about its pivot point 60 at 59A engaging the latches 18 and about the time one-fourth of the slots have been uncovered latch 18 has been raised sufficiently to release the indicating member 12 and unlatch the member 63 permitting the valve which is under spring tension to close instanteously.

Attention is called to the fact that the instant the coin has been released, as shown by position H, see Fig. 4 for the return of the coin to the depositor, counter-clockwise movement of handle 33 is possible. No coin then can be inserted until the handle 33 has been returned to the coin receiving position. This is then possible because movement of the handle 33 to the coin receiving position has automatically released the entire mechanism and caused the closing of the automatic valve 70.

Operation

Fig. 2 illustrates the hose hanger on its hook lever and Fig. 12 illustrates the handle 33 properly positioned for the start of the operations. If left in the position as shown in Figs. 2 and 7 by the previous purchase, it must be manually rotated clockwise from that position to the position shown in Figs. 1 and 12. This, see Fig. 6, elevates the coin guard plate 5, through pin 31, extension 22A and rod 20 so that the desired coin may be inserted in slot 432 in plate 431. If the coin is not rejected and returned to the purchaser the coin seats on carrier 8 and then is rotated counterclockwise therewith by handle 33 until it first engages selecting lever 12, which is tilted and caught by a latch 18. Insertion of a coin drops the coin guard plate by reason of first raising the guard plate on coin insertion, thereby causing separation of parts 20 and 22, so another coin cannot be inserted.

As previously explained, pulling down on shoulder 61a on bar 61 by pin 31 in its rotation with gear 28 and handle 33 opens the outlet valve 70 and same then is held open by latch 63. Also near the last phase of the rotation of handle 33, the switch carrier 39 has been moved from the tilted position, see Fig. 8, to the active position, see Fig. 10 by reason of lever 12 engaging arm 13c on shaft 16, see Fig. 4, which shaft is coupled to shaft 19 carrying the arm 38, see Figs. 7, 8 and 9. Clockwise tilting of any lever 12 by any coin, tilts counter-clockwise lever 13 aforesaid so that end 13A thereof is elevated to the full line positions, see Fig. 4, to hold the coin which now has passed from lever 12. In the final counter-clockwise movement of handle 33 the member 80 is depressed by projection 29 on gear 28 to tilt the carrier (compare Figs. 10 and 11) and thereby cause switch 40 to shift to closed circuit position.

This switch closing closes the motor circuit unless another switch is included therein, which other switch is normally open but is closed when the hose is removed from its hanger lever, as otherwise herein explained. Since the outlet valve 70 is now open, the actual dispensing begins as soon as the hose hand valve 409, see Fig. 2, is opened. If this valve be not opened, the pump bypasses the liquid back to the reservoir.

If dispensing starts, the meter actuates the computer 404 and this in turn rotates shaft 49 carrying with it the several coin pins 53—54—55, Figs. 13 and 14. After the proper amount has been dispensed, such in effect causes a pin to engage a selected latch 18 and trip same, which, as previously described, elevates gravity latch 63 to release the outlet valve 70 to its spring and closes same.

When latch 18 is released, the lever 12 is released and then shaft 16, link 37 and arm 35, etc., are permitted to drop the switch carrier to the position shown in Fig. 8. In Fig. 6 latch 18 holds lever 12 to hold lever 13 tilted counterclockwise all during dispensing, but when lever 12 is latch 18 released the shaft 16 of said lever 13 functions as aforesaid, see Fig. 3, hence coin passes to position G, see Fig. 4, and thence to the coin box. Upon the aforesaid release of lever 12, lever 13 as aforesaid (by gravity) tilts clockwise, which through arm 36, link 37 and arm 38 drops the switch 40 and carrier onto support 42. This opens the motor circuit and dispensing stops.

The equivalent distance-volume adjustment of the pins 53—54—55 on gear wheel 47 for price variation is as described herein.

When dispensing has ceased as aforesaid, the handle 33 is returned clockwise to condition the pump for a subsequent dispensing operation. The wheel 47 is simultaneously returned with handle 33 to zero position. Such handle return causes pin 31 to engage tail 22A to elevate end 22B to raise end 20A of member 20 and lock same in elevated position. Continued handle return then causes pin 31 to tilt lever 23B as aforesaid. All other parts are similarly repositioned in starting position, whereupon the cycle may be repeated.

Whenever the purchaser cannot take all of the purchase, if the hose be hung up this action actuates trip 59, see Fig. 15, by arm 109 tilting arm 59E to trip at 59A the latch 18 for stopping pumping and closing of the outlet valve corresponding to the automatic closing thereof following dispensing of the purchased amount all as aforesaid.

Whenever no liquid is available, while the pump unit is set up for dispensing, naturally nothing will be dispensed, so that return of the coin to the purchaser can be effected. However, as soon as dispensing starts, the interlock actuated by wheel 47 locks the coin against its return to the customer.

Motor or current failure similarly results in no delivery and no locking up of the device occurs as upon initial dispensing, so that the purchaser can obtain the return of this coin. Note also, as herein explained, that the computer (wheel 47) is automatically returned to "zero" position when the handle 33 is turned clockwise to condition the coin guard plate for coin passage and initiation of a new dispensing cycle.

From the foregoing, therefore, it will be apparent that certain features of this embodiment of the invention are basically somewhat similar to those disclosed in the prior Patent No. 1,891,950, dated December 27, 1932, the similarity being especially noticeable in the switch control, the coin selection and throwout arrangement and the coin selection of the indicator to be utilized. The power, however, and the means operable by the power, this being derived from the "variable speed" shaft is radically different. The control mechanism and inter-controlled relationship also is different and this difference is also more apparent in that the invention herein is applied to a predetermined stop pump which is not of the visible type as disclosed in said patent.

Before proceeding with the description of improvements on said pump, the same having been installed and successfully used since the spring of 1938, it is to be understood that this pump can be operated by the station attendant through coin deposition and thus dispense to the customer all or any fractional amount of liquid for which the deposited coin has conditioned said pump. Furthermore, the undispensed balance can be subsequently dispensed in one or more operations.

Fig. 12 shows the initial or zero position of the entire mechanism. First it shows handle 33 in the zero or initial position. It shows gear 28 and gear 47 in their initial positions. In this position, pin 31, which is carried by gear 28, is locked by member 23 at 23B'. The shutter is then held in the open position by member 22 at 20. The indicating member 12 is in the zero position. The lock latches 18 are in the unlatched position and held in this position by the common lever member 59. The latch 63 with the extension 63A rests on the left-hand portion of members 18, and the valve 70 is in the closed position, being held closed by spring tension. The exterior of switch members 36 and 35 with the connecting link 37 are shown in their original position. By referring to Fig. 5, it will be noted the open slots are exposed through the housing. The lower portion of Fig. 3 shows the position of coin carrier 8, and members 12, 13, 17 and 10 when the mechanism is in the position as shown in Fig. 12. The switch box shown on Fig. 8 at the lower left-hand corner shows the position of the switch and component parts in the initial position. This compares with the position as shown in Fig. 12 and the lower portion of Fig. 3. After a coin has been inserted, as shown in Fig. 3, it strikes the magnet, and if a proper coin it would follow the dotted line course of B, C and D. If of the proper weight and not the proper rebound, it is rejected as at E.

After the coin has been inserted, the magnet carrier and shutter which has been released from engagement with 22 by the slight raising of the shutter 5 by the coin itself upon insertion, drops to the position shown in Fig. 8. Pin 21 sliding along 23A has forced the locking member 23 out of engagement with pin 31, Fig. 12, and permits free rotation of handle 33 counter-clockwise, carrying with it its assembly, namely, the pointer 33A, gear segment 28 with pin 31 and switch actuating member 29 and sheave wheel 32 and coin carrier 8. Pin 31 upon continued counter-clockwise movement of lever 33 first comes in contact with lever 44, forcing it clockwise thus releasing gear 47. Pin 31 then comes in contact with member 61 at 61A carrying member 61 downward. The extended portion 61C, being held in contact with pin 62 by spring tension, gradually is released from pin 31 on the downward movement. This downward movement of member 61 pulls the valve operating lever 68 down, opening the valve 70, and the latch 63 engages the top portion of lever 68 holding it locked in the open valve position. Simultaneously with the opening and latching of the valve as just described, the coin carrier 8 (which is mounted on shaft 9 and carried with the assembly of handle 33) is moved into the position shown in Fig. 4. In this position, volume selecting lever 12 becomes latched by lock latch 18. The coin selected lever 12 and the valve 70 is thus locked in operation or delivery position. It is to be remembered that when the coin was inserted in the coin slot, see Fig. 5, same raised the shutter sufficiently to unlatch it. The shutter assembly then dropped to the position as shown in Fig. 8 permitting release lever 59 to follow it and thus become disengaged from contact with latches 18. Hence, lever 59 releases latches 18 before same are actuated by member 12. With the coin in the position shown in Fig. 4 at F and member 12 latched, as shown in Fig. 10, the motor switch has been elevated by the action of member 13, shaft 16 and the external switch assembly, but the switch is not in the closed position. In order to close the switch it is necessary to rotate handle 33 slightly counter-clockwise until lug 29, mounted on gear 28 and which is a part of lever 33 assembly, comes in contact with plunger 30, forcing it downward as shown in Fig. 11. In this position the circuit is closed, the valve 70 is open, the coin selected indicator lever 12 is locked open, gear 47 is released for movement counter-clockwise and all of the mechanism except gear 47 will remain in this position until the cycle is completed. When delivery is started, that is when the motor circuit is closed and the fluid starts to flow, gear 47 which floats on shaft 49 is picked up by the pawls 48 and rotated counter-clockwise. In this particular embodiment of invention, three stop pins 53—53A, 54—54A and 55—55A for 25¢, 50¢ and $1.00 shown in Figs. 13 and 14, as mounted on plate 52 and secured to segmental gear 47, shaft 49 being geared to the recording mechanism, rotates with it. Upon rotation of gear 47 and the pins, the corresponding pin engages the extended portion of coin actuated lock latch 18 forcing it clockwise thus releasing coin selected indicating member 12 and the common lock latch 63, releasing the coin from member 13, see Fig. 4, to the money box and instantaneously closing the valve 70. Gear 47 has thus rotated counter-clockwise to a position indicated by the selected pin. The valve is closed, the motor circuit is open, and the shutter 5 is closed. To recondition the machine for subsequent operation it is necessary to turn lever 33 clockwise and in so doing the tooth portion of gear 28 then will engage the tooth portion of gear 47 and on the continued clockwise movement of 33 the gear 47 will be rotated until the blank 47C shown on gear 47 becomes exposed relative to the teeth on gear 28. When this occurs the pin 31 in gear 28 has become disengaged from lock latch 44 so that the latch 44B immediately engages and holds gear 47 in the zero or initial position. Continued movement clockwise of lever 33 causes pin 31 to engage the tail portion 22A of member 22 elevating portion 22B to contact with member 20A and further movement causes the latching of portion 20A with portion 22B. During this return movement, member 20 is raised and pin 21 has been elevated sufficiently to allow member 23 to become engaged with pin 31 at 23B'. Upon completion of the cycle or delivery, lever 12 and member 13, see Fig. 4, take the dotted line position and the coin rolls to position G.

Reference will now be had more especially to Figs. 15 and 16, wherein there are illustrated other embodiments of the invention. Inasmuch as the previous embodiment of the invention has been described in considerable detail and has been very fully illustrated, the present embodiment of the invention is not thus fully illustrated but is skeletonized, especially as to the parts shown in Fig. 15. By super-positioning and proper reference, the same also applied to Fig. 16. For a proper understanding of the forms of the invention shown in Figs. 15 and 16, the parts will be referred to as comparable, similar or identical to the corresponding parts in the first embodiment, the similar reference numerals in these figures referring to identical or comparable parts similarly designated by primary numerals as appear in Figs. 1 to 12 inclusive. Note that the adjustable arrangement illustrated in Figs. 13 and 14 also may be utilized whenever unit volume-price variation adjustment is desired.

In Fig. 15, there is illustrated the line 413 controlled by the valve 70' and discharging to a hose as previously described. In this instance, the valve shaft 101C is comparable to the shaft 70A and member 101 herein is comparable to member 68. In this embodiment of the invention, the coin selected lever or members 12' are retained. Note, however, for clearness only the selected lever is illustrated and the same is shown in coin actuated position. In the illustration of the present form of the invention, the switch box and its contained switch and actuating mechanism is omitted to show the application of the mechanism without the use of the mercury switch. The lever arm 36' herein is directly connected at 104A to the member 104 comparable to the member 34. Member 104 has the shoulder 104C, and the weight portion 104B comparable to part 34A.

The manual control in the present form of the invention may be by a handle not shown mounted on the shaft 9' in which event the latter extends through the front cover plate as in the first form of the invention. However, when it is desired to mount the handle at the side of the pump instead of at the front of the pump, the following arrangement may be employed and this applies equally as well to the form of the invention shown in Figs. 1 to 14 inclusive. When this variation is desired, the shaft 9' will not project through the front cover plate but will have mounted thereon within the pump housing and at the front end of said shaft, the bevel gear 105. Meshing therewith is a similar gear 105A. Shaft 99 carries said gear 105A and the shaft is rotatably supported in stationary bearings 107 formed on the base structure 106 mounted as indicated on the base proper 106A. This shaft 99 will extend through the side of the housing 400' and at its outer end will mount a handle comparable to the handle 33 provided with an index member 33A, shown in Figs. 1, 2, 7, 9 and 12. However, it is to be noted that due to the gearing interposed the direction of rotation of the substituted handle, in this form of the invention, is just the reverse of that set forth with reference to the handle 33 and the indicator 35A of the first embodiment of the invention although the direction of the rotation of shaft 9' is the same. In this form of the invention, the coin control throwout and selecting mechanism is substantially the same as that previously described in the first embodiment for a coin operable pump. Likewise, the locking member for the pin 31' is substantially the same.

This form of the invention differs from that of the first embodiment in that the gravity latch 63 of the first embodiment and the lock latch 18 of the first embodiment are herein combined into a unitary structure and the power for opening the outlet valve in this embodiment of the invention also is modified from that shown in the first embodiment. With but few exceptions, the same numerals previously applied to the first form of the invention are now utilized in their prime designations to designate like or substantially similar parts in this embodiment.

This combination construction has the several lock latches 18' and includes a pair of spaced members 100 between which are supported the individual lock latches 18', the same being pivoted on shaft 18A which extends from one member 100 to the other member. Each latch 18' is equipped with a movable latch portion 18H pivoted at 18K. Each latch is constrained by the independent spring 18I. One extreme position of latch 18H is controlled by the adjusting bolt 18D'. 18B is the member 12' catch portion of the latch 18H. Face 18C is the approach contactable face of latch 18H and spring 18I holds 18H projected.

This latch construction permits the coin operable lever 12' to become engaged back of the latch 18B without raising the latch 18' beyond the horizontal position. This also permits the latch 18' to have free movement about the pivot 18A in a counter-clockwise direction. The extended portions of the spaced members 100 are connected together by pivot 18A at one end as shown and at the opposite end and such connected opposite portion, see 100', as well as the members 100, are notched as at 100A, see Figs. 15 and 21.

The spring loaded valve 70' has its spring constrained shaft 101C provided with the lever 101. Lever 102 connected thereto at 101B is the operating lever for this valve and corresponds to the member 61 of the first embodiment. The latch 100 corresponds to the gravity latch 63 of the first embodiment.

When the pin 31' in the present embodiment of the invention, which is mounted on the rear face of the gear 28', is turned in a counter-clockwise direction, it engages the shoulder 102B of the member 102 and forces member 102 to the left thereby opening the valve 70' and then leaves the member 102 in the further movement counter-clockwise of gear 28'.

When the member 102 has been moved to the left, the extreme amount, it will be noted that the member 100 which is free to move counter-clockwise about the pivot point 18A drops down so that the shoulder or notch 100A lies to the right of or behind the portion 101A of the lever 101 thus holding this lever 101 in the open valve position. A stop 100D limits the lowering movement of this unitary latch and lock construction in the event the same becomes necessary which would be the case when the lever 101 is moved a considerable distance to the right and clockwise into the closed valve position. When this latch and lock 101A—100A is effected the valve 70' is locked in the open position and in that position, the member 101 is under valve spring constraint which is sufficient to close instantaneously the valve 70' when the valve lever 101 is released from the lock, and to return the lever 101 to the valve closing position of said lever.

The member 102, connected to the lever 101 and being the actuator thereof, is slidably supported within a guide structure 102C carried by the member 102D. The slot in this member 102C is of sufficient length to allow or permit the member 102 to have some movement about the pivot point 101B. This is required especially in the anti-clockwise movement so as to allow the pin 31' beforementioned to pass the portion 102B when the supporting gear 28' and the pin are rotated in the clockwise direction for movement beyond the position where pin and member 102 engagement occurs.

It will be noted that each of the individual lock latch members 18' includes the portion 18D which is engageable by the common lateral portion 59A' of the member 59' engageable at 59B' by the coin conditionable mechanism previously described and embodied in the first form of the invention, and more especially, the magnet support. Arm 59B' is elevated when the shaft 99 is rotated to return the coin to the purchaser and recondition the coin receiving mechanism for subsequent coin reception. In this form of the invention it is pointed out that rigid or integral with the member 59' is a lateral arm 59D' slidably supported in the bracket 59C', the purpose of this arm being set forth more fully hereinafter. This arm may or may not be employed in this second embodiment of the invention.

It will also be noted herein that the gear 47' and all of its associated parts are identical to that previously described with reference to Figs. 1 to 14 inclusive and therewith is associated the gear latch 45'. In this instance, this latch 45' is associated with the substituted member 104 in place of the member 34'. The stops 53'—54' and 55' may be carried directly upon the gear 47' or upon the coaxially adjustable plate 52', see Figs. 13 and 14, as previously described, with respect to the adjustable modification of the first form of the invention illustrated and described.

These pins are adapted to selectively engage at 18E the member 18' which has been coin selected through the actuation of the coin selected lever or member 12', the latter operating thereon through the latch portion 18B. The coin selected member 12' when moved clockwise through coin selection and actuation into the vertical position forces its associated lock latch 18' clockwise upon the pivot 18A and inasmuch as all of the latches 18' underlie the pin 100B that extends between the two side members 100 the entire unitary locking construction is elevated in a clockwise direction about pivot 18A. The adjustable latch 18B pivoted at 18K only requires the movement of the latch 18' to the horizontal in order that the member 12' may be locked in the vertical or indicating position. Simultaneously with the locking of this member 12' in indicating position, the valve lock 100 has been moved into position for latching the valve lever 101 at 100A—101A, as previously described.

Insofar as the aforesaid parts are concerned, the same taken with the other parts identical to that illustrated in the first general form of the invention, will function in substantially the same manner as previously described.

Reference will now be had to the right-hand portion of Fig. 15 wherein 114 indicates a hose nozzle bracket or support and pivoted at 110C in juxtaposition to the supporting portions of the bracket is a lever 110 extending within the adjacent housing 400'.

To the inner free end of said lever is pivoted at 110A the depending member 111. The weight thereof, or a spring, if desired, normally constrains this lever to "closed circuit" position. This lever, at its lower end, see Fig. 15—A, is attached to a switch 2 included in one side of the circuit to motor 425'. Coin actuable switch 40' similar to switch 40 of Figs. 1 to 12 similarly controls the other side of the circuit to the motor. If desired both switches may be in series in the same side of the circuit to said motor. Removal of the hose hanger from its support, therefore insures automatic closing of this side of the motor circuit for motor operation of the pump. When manual control of the switch is desired, the spring tension is eliminated to make the switch actuation manual.

It is further to be observed that the switch box and assembly with its actuating mechanism as shown in Fig. 2 and Figs. 7 to 12 inclusive and lever 34 substituted for lever 104 in Fig. 15, is utilized where dual motor circuit control is desired, as previously described, and likewise the switch assembly shown in the beforementioned figure can be eliminated and lever 104 can be substituted for lever 34 in these figures where a single motor switch is desired.

As previously described, when the coin controlled switch is utilized, a proper coin must be employed and manipulated to close the other side of the motor circuit. Of course, both switches might be in series with each other and in the same side of the motor circuit.

Whenever, the coin operable or controlled motor switch is desired to be omitted, it will be obvious that mere removal of the hose from its support then will insure motor operation. While the motor and pump operate no fluid will be dispensed because fluid will bypass the pump so long as the coin or manually actuated selecting or setting up (predetermined stop) mechanism has not been actuated, as described in the previous embodiments of the invention for the reason that the main outlet valve 70' is locked closed until properly actuated, as described, so that when the coin operable switch is utilized, the hose hanger switch may be employed or omitted and when the hose hanger switch is employed, the coin controlled switch may be omitted or employed as desired.

Reference will now be had to the upper right hand portion of Fig. 15. It will be recalled that magnet support operable lever 59' operable through portion 59B releases or conditions, or clears the mechanism for operation by portion 59A' engaging coin selected latch 18' at 18E, or the corresponding parts similarly indicated in the embodiments disclosed in Figs. 7 to 12 inclusive if lever 59', et cetera be included therein.

As previously described, lever 59' in Fig. 15 has arm 59D' guided in the stationary guide 59C' which also limits the clockwise tilting of member 59' if not limited by magnet moving structure 4'. The free end 59E' terminates adjacent the upper end of a tiltable member 109 which at its lower end is attached by shaft 109A at 110D to the hose hanger associated lever 110. Member 109 has limited pivotal movement, the same being controlled by stops 110E and 110F on the lever 110, as shown.

When the member 110 is tilted counterclockwise upon its support 110C by the weight of member 111, upon hose nozzle removal, the member 109, at its upper end drops below the level of bar or arm 59D' as shown by the dotted lines.

When the switch has, or switches have, been closed and the delivery required has not been completed and the hose and nozzle is returned to the hanger support, the latter action tilts lever 110 clockwise about pivot 110C. Thereupon the upper end of member 109 engages the projecting end of arm 59D' and tilts arm 59' counter-clockwise effecting the same operation upon latch 18' through member 59' as if latch 18' had been actuated by the value or volume pin cooperating with said selected latch lock 18' or actuated by coin return as through arm 59B'.

This actuation, therefore, insures closure of the outlet valve 70' so that no further fluid is dispensed and release of the selector lever 12' thus reconditioning the entire mechanism for coin reception upon return of the handle, not shown to receiving position. Of course, hanging up the nozzle also cuts the motor circuit if the hose hanger motor switch is employed. If the coin controlled switch is employed it also is opened and returned to open circuit condition position as previously described, when the lock latch 18' is released or tripped. Both actions occur and simultaneously if both switches be employed. Thus, what might be termed the undelivered fluid portion of the coin selected amount is not delivered or deliverable. This eliminates the fire hazard incident to a positive delivery device.

Reference will now be had to both Figs. 15 and 16 wherein two modifications of a supplementary interlock are disclosed. Pivoted at 112A, see Fig. 15, is a latch member 112 normally constrained to locking or latching position. Its lower end is tapered as at 112C and adjacent thereto is locking shoulder 112B. Gravity normally holds shoulder 112B under the left hand end of pivoted hose hanger operable lever 110 and prevents counter-clockwise tilting thereof (corresponding to switch closing) no matter if the hose nozzle bears on the lever or not.

A tail or arm 112D extends into juxtaposition to the vertical reciprocable coin slot guard moving member 20', movable upwardly when member 22' is tilted counter-clockwise by pin 31' as previously described. When so tilted, the member 20' is held elevated by latch 22B'—20A'. In this embodiment of the invention member 20' also mounts pin 113 and the same may constitute a stop for limiting downward movement of member 20' by engaging guide bracket 20C'.

However, in the present embodiment of this invention catch 112 has its arm portion 112D provided with a cam or inclined face 112E. When a coin is deposited to utilize the device, member 20', it will be remembered, is released from catch 22B'—20A' and drops, which in turn removes the counterweighted latch 23B1' holding pin 31' and gear 28'. The shutter plate is also lowered preventing insertion of a second coin previous to the return of the first coin or its proper use in the device.

In this lowering movement of member 20', pin 113 engages cam face 112E and forces member 112 clockwise upon pivot 112A to move shoulder 112C to the left and from below the lefthand end of hose hanger lever 110. Only until this occurs can the hose hanger switch be released to close the motor circuit. When the hose nozzle is hung up the free inner end of lever 110 at 110G engages and rides the cam face 112C tilting the lock latch 112 clockwise until said end 110G seats above shoulder 112B. This tilting of the lock latch has no effect on member 20'.

In Fig. 15, in addition to the previous departures of the disclosure from the invention as illustrated in Figs. 1 to 14 inclusive, there is illustrated sheave wheel 108 which replaces sheave wheel 32 and eliminates the sheave wheels 72—73 of said Figs. 1 to 14. The computer set back cable 74' is connected to this wheel 108 and the operation is substantially as that previously described except that due to the rotating of shaft 9' by shaft 99, the wheel 108 is mounted on the latter and the intermediate direction changing sheave wheels may be omitted. Having the handle on the side of the pump thus permits of this simplification as well.

A slightly modified form of the hose hanger lever control or interlock is illustrated in Fig. 16 wherein parts like those illustrated in Fig. 15 are similarly identified by the double prime designations. Hose hanger lever 110" herein normally is held against release for fluid supply by latch-lock 115" pivoted at 115A" and having locking shoulder 115B" and inclined face 115C". Herein vertically slidable member 20", provided with cam pin 21" also mounts pin 116" comparable to pin 113" of Fig. 15. This pin 116" herein underlies tail portion 115D". The operation of the associated parts in Fig. 16 is identical to that described for the corresponding parts in Fig. 15 except the pin and lock-latch engagement is of specifically different character. The hose nozzle lever 110" is provided with a control member 111", one function of the same being previously described and also member 109" having the functions previously attributed thereto as described relative to Fig. 15.

In this particular embodiment of the invention, it is to be observed that the reconditioning of the mechanism for coin reception automatically unlatches or unlocks the switch lever 110" while in the embodiment of the invention shown in Fig. 15 the closing of the coin slots automatically releases the switch lever 110.

It is to be understood, as can be readily comprehended from the foregoing detailed description and explanation, that many of the embodiments disclosed herein are capable of utilization in a coin pump of the gravity feed type or a coin pump of the hand operable pump type. In the latter instance, the pump would have an exposed handle operable manually and to and fro to pump fluid from the underground tank to the "wet hose." In that event, member 111 would at its lower end, not shown, tilt a lock member seatable in a notch on the shaft of the hand operable pump to release the pump to hand operation. This hand operable dispensing pump mechanism is so well known that no illustration or further explanation thereof is believed necessary since the additional mechanism thereto herein claimed is fully disclosed except for the shaft notch and notch seating member.

It is also readily apparent from the foregoing illustrations and description that substantially any or all of the basic modifications disclosed may be utilized severally or jointly as desired or required.

Pumps of the type shown in Fig. 15 were installed and successfully used and are now being used at Tonawanda, New York, and since the fall of 1938. Such pumps did not include the interlock arrangement represented by arm 59D', member 109 and catch 112, but did include member 111.

It is to be noted that in the coin controlled type, should there be a failure of the supply and only a portion of the coin selected amount be delivered, that immediately upon such failure, the meter or the like fails to operate and therefore the primary source of power for the measuring or predetermined stop mechanism remains inoperative. This locks the device against further operation. The position of gear 47', which may carry a dial relative to the zero point, will indicate the gallons actually dispensed.

When the service station attendant returns, as the next morning, he ascertains the locked character of the pump, the gallonage actually delivered, the coin selection made, and from that can compute gallonage due customer. Only the person entitled to the refund will have knowledge of all these facts. No subsequent potential customer, because of the shutter plate control, can deposit a coin so only one customer is entitled to a refund and by the foregoing his identity can be established and verified.

The refund description applies only when the station attendant has control of the coin box or rather the lock 402A permitting access thereto. However, as previously set forth, the lessor of such pump would utilize all tanks as its major reservoir maintaining same full at all deliveries. In this event, the attendant would have no occasion to make a refund except in the event of power failure. Thus, the lessor would only have control of the lock 402A, and such lessor instead of hit-and-miss delivery to service stations in response to exhausted supply calls would service such stations on a regular route basis. An independent "trouble" service by lessor would take care of such current failure refund transactions.

The combination gear and housing is provided with a gear race way or channel to accommodate the internal gear segment 203 and also internal gear segments 204 and 205. It is also provided with cutaway portions to accommodate the meshing gears indicated by the numerals 206, 207, 208, 209 and 210. This gear and housing is fitted with an internal gear retaining ring 202 and a cover plate 201.

Mounted on the internal gear 203 is a stop or tripping pin 203A. A stop or tripping pin 204A is mounted on the internal gear segment 204. A stop or tripping pin 205A is mounted on the internal gear segment 205.

Gear 208 is mounted on the spindle 208A and said gear meshes with the internal gear 203. The spindle 208A has the gear 208 rigidly mounted on it with a bearing in the housing 200. Gear 207 beforementioned is mounted on the spindle 207A and meshes with the internal gear segment 204. Gear 206 is mounted on the spindle 206A and meshes with the gear segment 205.

Combination actuating and computing mechanism

Whenever it is desired to utilize the actuating or control mechanism as a computing mechanism and utilize the same in connection with a meter or measuring device set for constant measurement per cycle, the shaft leading from such standard measuring device, it is to be understood, is a shaft having a constant speed of rotation in relation to the flow of fluid passing through that device. When such a measuring device is incorporated in the dispensing pump, the shaft utilized is the shaft of the meter which meter is shown more clearly in Fig. 2.

The construction shown in Figs. 17 and 18 may be substituted for the constructions 47, etc., shown in Figs. 7 to 14 inclusive. It is to be understood, that the ratchet 51' rigid with shaft 49' in Fig. 15 and the pawls 48' are carried by the face of the structure shown in Figs. 17 and 18. For simplicity, the same has been omitted from said figures.

In these figures, 200 indicates a combination gear and housing. The gear portion of this housing has a toothed peripheral portion 200A, and a gap, cutaway, or toothless, portion 200B. This corresponds to gear 47 in Figs. 7 to 15.

Idler gear 209 is mounted on the spindle 209A and is interposed between and meshes with the gears 207 and 208. Idler gear 210 mounted on spindle 210A is interposed between and meshes with gears 207 and 208. In all cases, the several spindles mentioned are integral portions of the housing or rigid therewith except the spindle 208A which, however, has a fixed axis relative thereto. Idler gears 209 and 210 insure the same direction of rotation for gears 206, 207 and 208.

When the several gears and segments are assembled in meshed relation, the same have a proportion of 1:2 and 2:4. The result is a construction which is capable of calibration in a 1:2:4 ratio. When the gears and gear segments are assembled in the race in the housing 200 and intermeshed, as described, said gears will always travel together and in the proportion mentioned above. The cover plate 201 is provided with a calibrating scale or dial 212. An adjusting knob 211 is rigidly mounted on the spindle 208A, which also has a bearing in the cover plate 201 and to this spindle is affixed gear 208.

When the knob is moved, gear 208 moves gear 203 and through gear 209 moves gear 207 which moves gear 204 and through gear 207 and 210 moves gear 206 which moves gear 205. Thus, these segmental racks or gears 203, 204 and 205, together with their stop or tripping pins 203A, 204A, 205A, respectively, are properly timed or assembled in the 1:2:4 relation relative to a definite zero point indicated by the letter O in Fig. 17.

These stops or tripping pins may be caused to move closer or farther away from each other in the proportions of 1:2, 2:4 by turning member 211 carrying the pointer 211A. The dial is calibrated in cents and herein the same is shown as being marked or legended in cent graduations from 10¢ to 24¢, this being the cost per gallon.

The operator adjusts the mechanism by having the pointer 211A register with the proper cost per gallon.

It is to be observed that no matter what adjustment is made, the zero point O of the mechanism always remains the same, but that the annular distance that the respective stop pins are positioned therefrom is adjusted in the aforesaid ratios by means of the adjustable construction last described. These pins are the equivalent of pins 53, 54 and 55, see Figs. 7, 12 and 15.

It will also be obvious that the lower the unit price per gallon, the greater will be the annular distance between the respective stop pins shown in Figs. 17 and 18, and the higher the unit price per gallon, the less will be the distance between said stop pins or tripping members. The space between the cover plate 201 and the retaining ring 202 provides openings or clearance for the free passage or movement for the aforesaid stops or trips 203A, 204A and 205A.

As shown in Fig. 18, the pin 203A is the longest pin. Pin 204A is the intermediate length pin and pin 205A is the shortest pin. The reason, therefor, is as follows: When a larger volume of fluid is to be dispensed, the larger value coin trip mechanism is positioned to the right of the end of the pin 204A so that the pins 204A and 205A do not actuate the same. Similarly, the corresponding mechanism for the intermediate valued coin is positioned to the right of the end of the smallest length pin 205A so that it in its movement has no effect on the tripping mechanism and so that said last-mentioned tripping mechanism will be engaged by the pin 204A for the purposes previously described.

The tripping mechanism associated with the pin 205A lies immediately to the right of the mechanism, to-wit: gear housing and cover plate shown in Fig. 18 so as to be coplanar with said pin 205A so as to be actuated thereby. This Fig. 18, it will be observed, corresponds to a certain extent to the disclosure found in Fig. 13 and from the description previously given with reference to the parts illustrated therein and their utilization and operation in the form of the invention disclosed in Figs. 1 to 15 inclusive, the operation of the dispensing apparatus with the combination actuating and computing mechanism illustrated in Figs. 17 and 18 will be clearly understood.

In Figs. 19 and 20, there is illustrated a modified form of variable stop and computing mechanism. This is of the linear type. In this form of the invention, it is to be understood that the rotative elements and structures carried by the usual power shaft 49 are retained, but in place of the plate carrying the progressively offset and progressively elongated pins, there is provided the linear or elongated mechanism shown in Figs. 19 and 20.

Shaft 49''', see Fig. 19, rotatably mounts the idler pinion 304, and this pinion is driven by the ratchet gear 51, see Fig. 12. The rack 302 is held in position by means of guide 306, see Fig. 20, so that said rack meshes with the pinion 304, see Fig. 19. The guide 306 is rigidly mounted upon the frame of the actuating mechanism. The rack 302 is provided with the extensions 302B and 302C. These extensions provide bearings for a multiple screw 301 parallel to the rack. This screw 301 is provided with three different threads of predetermined length and to conform to the previous description for the same range of adjustment, the ratio of said lengths is 1:2, 2:4.

For example, for the ratio of 1, a thread of 72 threads per inch can be used. For a ratio of 2, the threaded portion would have 36 threads per inch. For a ratio of 4, the threaded portion would have 18 threads per inch. Any other combination of threads suitable for the purpose may be employed. Mounted on said screw 301 are the stop or trip members 300A, 300B and 300C. The stop or trip 300A would be provided with a thread tapped for 18 threads per inch and correspondingly stop members 300B and 300C would be tapped for 36 and 72 threads respectively.

The lower ends of each different thread portion on the screw would determine the zero position on the mechanism and the corresponding lengths of the respective threaded portions would determine the available spread of calibration. The lengths of these threaded portions, naturally, are in substantially the same ratio, to-wit: because 1:2 and 4 have been selected for illustration in the ratio of 1:2 and 4.

Mounted on one end, and it may be either end, of the screw and preferably beyond the offset portions on an extended portion 301A of said screw is a knob 305 having a pointer portion 308. A dial plate suitably legended, and indicated by the numeral 307, is preferably rigidly secured to the rack arrangement adjacent the adjusting knob 305.

The operation is as follows: For adjusting for price variation, the knob 305 is turned so that the pointer 308 registers with the proper legending indicating the price for which the device is to be set. This dial may correspond generally to the dial shown in Fig. 17. If the previous price setting has been of higher value, the knob is turned to the lower value and in so doing, the screw is rotated so as to cause the trips to be positioned at a greater distance apart. If the new price level is at a higher cost than that for which the device has been previously set, the knob is moved to the higher price position, indicated by the dial, and in so doing the knob rotates the screw and this causes the trips to move closer together. Thus, the adjustment herein disclosed for price variation is the full equivalent of the rotative type disclosed in Figs. 17 and 18. Each of these forms is in itself a computing mechanism, and is used in connection with a meter of constant volume per cycle.

The operation of the form of the invention shown in Figs. 19 and 20 is as follows: It will be noted that each of the trips has extended portions designated by the prime subscript numerals. As shown clearly in Fig. 20, these trip portions are laterally offset, each from the other, so that they have, as it were, three effective parallel planes of operation. In this respect they correspond to the three effective planes of operation of the tripping pins shown in Figs. 13 and 18.

The arrangement as shown in Fig. 20 is such that it is clearly evident that these tripping portions are always maintained in parallelism, irrespective of their relative position, due to price changing adjustment. As the power is derived from shaft 49''' in substantially the same manner as previously described for the other forms of the invention, the tripping pins are properly positioned so that in the dispensing of the liquid from the machine, the trips as a unit move longitudinally with reference to the axis of the screw from the starting position toward the predetermined volume which is determined by the point of contact of the selected stop or trip member with the associated tripping mechanism previously described, whereupon further dispensing ceases.

It will, therefore, be apparent that the form of the invention shown in Figs. 19 and 20 and the form of the invention shown in Figs. 17 and 18 operate in substantially the same manner as the form of the invention illustrated in Figs. 13 and 14 insofar as stopping dispensing when the predetermined selected volume has been dispensed.

In addition to this, the zero point is established in the same manner as previously described, either of these elements being substituted for gear 47 described in the other forms of the invention.

A further modified form of the invention is disclosed in Fig. 21, and as initially stated in the brief description of this figure, the mechanism herein disclosed is basically comparable to the previous forms of the invention and more especially the first form described herein, although the combination trip and latch arrangement shown in Fig. 15 and in the upper lefthand portion thereof is herein included.

It is to be understood that shaft 949 and shaft 909 are utilized together with the latch mechanism shown in the second form of the invention, to-wit: the valve shaft 901C, the link 902 pivoted at 901B to the lever 101 having the catch portion 901A. The tiltable member is indicated by the numeral 900 and is pivoted at 918A. It is limited in its stop movement by the pin 900D. It has the notch 900A cooperating with the portion 901A. The mechanism is mounted adjacent a tiltable member 912 having a lower extension 912F and pivoted at 915. The latch construction pivoted at 918A, as previously described, includes a projecting portion having the front face 918E and the lower face 918F and there is associated therewith the other latch parts 918C and 918B.

Herein, since but one coin receiving disk is shown, but one tripper member 918 is shown, as illustrated in Fig. 21. In this instance, the lower end 912F of the member 912 is enlarged laterally and is adapted to be engaged by any coin in any one of the coin carrying members, although the invention herein, as previously stated, is shown illustrated, as associated with but a single coin carrying member. Herein, lever 913 pivotally supported at 916 mounts a pin 413A and to that extent, this lever differs from that shown in Figs. 3 and 4.

Pivotally supported at 499 is a platform 498 that rides on the lateral pin or shaft 413A.

The coin chute mechanism includes the coin chute 906 hereinbefore described, the tilting bar 902' with counterweight 902A, the usual magnet retainer, et cetera, and the movable coin guard, not shown. However, in the present form of the invention, the coin locking member for said guard is eliminated so that more than one coin can be placed in a slot and more than one slot may be utilized for multiple coin deposition. This is to provide multiple coin actuation and when that is effected, there will, be provided a sufficient number of coin receiving or interfering members and corresponding cooperating associated wheels to take care of nickels and dimes, as well as quarters, halves or dollars, see Fig. 24.

At the bottom of the chute portion 906 is the usual anvil 907. The coins deposited, after being released to the chute 906 by the tilting plate 902', hit the anvil 907 and bounce over into chamber 497 and defined by the member 496. The surplus coins over and above those that can be accommodate by the machine, after bouncing on the anvil 907 engage the coins previously trapped in the reservoir 497, are thrown back and pass through the throat E and are returned to the purchaser just as if they had been coins that had been rejected for failure to properly bounce.

Carried by the shaft 909 and operated externally by the handle, not shown, is a plate 408 comparable to the previous coin plate 8 except that in this instance the arcuate periphery of plate 408 is arranged or provided with a plurality of approximately semi-circular recesses or notches 408A and these are properly spaced apart an angular distance corresponding substantially to the angular distance between corresponding notches complementary thereto, and indicated by the numeral 452A, in the plate 452, which plate is a substitute for plate 52 shown in Fig. 13.

In this form of the invention, the other mechanism associated with the shaft 949 is retained. However, the toothed pinion 47 is now in the form of a toothless plate 947, not shown, and the gear 408 is also without teeth but carries all other functioning members carried by gear 28 shown in Figs. 7 to 12 inclusive. It will be recalled that therein gear 28 cooperating with pinion 47 determined the initial setting of the stop arrangements which subsequently upon fluid discharge selectively actuated the appropriately tripped catch or latch 18 shown in the upper lefthand portion of Fig. 12 and shown herein in the upper lefthand portion of Fig. 21 and as shown in Fig. 15, there is provided but a single combination latch and catch, and but a single tripping pin 453.

As the shaft 909 is manually rotated counter-clockwise in Fig. 21 with one or more coins in the reservoir 497, the carrier initial coin recess 408A picks up a coin and subsequent recesses pick up such additional coins as there are coins in the reservoir, there being a sufficient number of recesses 408A for all the coins which the magazine will accommodate, this being usually determined by the capacity of the pump structure.

As the plate 408 is rotated counter-clockwise with a coin in the first recess or notch or in any one of them, that coin immediately registers with an adjacent recess 452A in the plate 452. In the continued counter-clockwise rotation of plate 408, plate 452 rotates clockwise. The pawl and ratchet arrangement, shown in Fig. 15, associated therewith, permitting such free movement in that direction. This, as stated, is comparable to the movement obtained through the gears 28 and 52. Thus, the tripping pin 453 is moved clockwise from its zero or setting position which is immediately below the portion indicated by the numeral 918E in Fig. 21 because the pin 453 must move slightly below the position of portion 918E, as shown in Fig. 21, in the counter-clockwise direction in order to trip the member 918E to release the outlet valve from the locking mechanism to close said valve and to return the conditioning arrangement to zero.

It will be apparent that any number of coins in any number of these notches 408A will successively register upon wheel 452 even though they be not in successive notches 408A. To prevent improper registration of coins with notches 452 which is critical, a guard arrangement 410 is provided that extends down into the magazine 497 and prevents improper coin reception by the wheel 452. The number of coins associated with wheel 452, thus determines the clockwise movement of the tripping pin 453. When the outlet valve 901C is open and the pump is actuated, fluid is discharged, as previously described, and in so doing, the computer meter and/or shaft movement is translated into counter-clockwise movement of the pin 453 by means of the ratchet and pawl structure illustrated in Fig. 15 as secured to shaft 949 and interposed between said shaft and wheel 452.

When the pin 453 has returned to a position immediately adjacent the latch member 918E, it engages the same and in the continued movement, trips said latch. Then pin 453 is in the zero or setting position, thus being automatically returned to that position. Simultaneously therewith, the main discharge or outlet valve 70, Fig. 15, or 901C, Fig. 21, is closed as previously described and the motor circuit is opened. Any other type of mechanism control for cessation of pumpage may be utilized as previously described with reference to other modified forms shown in Figs. 15 and 16.

It is to be noted that if the magazine shown in Fig. 21 is loaded with coins and plate 408 rotated counter-clockwise should fail to pick up all of the coins when plate 408 reaches its extreme counter-clockwise movement, the point at which the motor circuit is closed, the cutaway portion 408C is positioned above the reservoir forming partition 496, and any coins remaining in the magazine will be released to the customer, as indicated at E in Fig. 3. To insure the aforesaid, it will be noted that the bottom of the magazine forming partition 496, and indicated by 496A, is sloped downwardly so that the coins will not be trapped in said reservoir.

It will be apparent that if but one coin is deposited, it will be picked up by plate 408, engage plate 452 at the appropriate time, move plate 452 clockwise the desired amount and then leave said plate. To prevent too great a movement of the coin with the wheel 452, an additional stop or stripper 410A is provided. Therefore, the coin is retained in the slot 408A. In the continued rotation of the plate 408, this first coin moves into engagement with the lever 912, and more especially, the portion 912F thereof and tilts the lever so that its upper end lies beyond the catch mechanism 918B thereabove, see Fig. 21.

Simultaneously, lever 913 is tilted to the dotted line position and the outlet valve is opened by member 902. This, as previously explained, insures valve opening and motor circuit switch positioning for closed circuit operation. Whether the wheel 408 includes more than one coin is immaterial. Each of them in turn is discharged onto the platform 498 and from there returned to the purchaser or released to the coin box, the latter action taking place only when the motor circuit is actually closed.

The motor circuit closing is only effected when the member 408 has been moved completely to its final position counter-clockwise, regardless of the number of coins associated therewith. In this movement, the actuating member 29, see Figs. 1 to 12, carried by the plate 28 engages the plunger 80 and tilts the switch support or frame into the closed circuit position. These parts, for simplicity, are not shown in Fig. 21 since they have been previously illustrated and described in detail.

Upon this engagement, the motor circuit is closed and fluid is dispensed. Upon this operation ensuing, the platform 498 assumes the full line position and permits the release of the coins into the coin box. Previously, this platform has occupied the position shown by the dotted lines being positioned to return the coins to the purchaser to the right of the abutment 53, see Figs. 1 to 12, in the event the motor circuit would not close. It is to be noted that in the counter-clockwise movement of plate 408, the periphery of the plate starting at 408F forms the right hand side of the coin receptacle, trapping the coins in position for release to the money box or for return to the customer if plate 408 is rotated clockwise as heretofore described.

Herein a single coin or the first coin in the carrier will open the valve, lock the member 912 in position, but the switch cannot be closed until the entire cycle has been completed, and during the rotation of coin carrier 408 from its extreme clockwise position to the switch actuating position, any number of coins can be picked up from the magazine and delivered past the volume selecting lever 912 and deposited on teeter 498 pivotally operated by 913. Each coin that is picked up registers its value on member 949 so that if one coin is picked up the value of one coin will be registered; if two coins are picked up the value of two coins will be registered. Any coins which are not picked up by carrier 408 are returned to the customer immediately upon closing of the motor circuit.

It will, therefore, be apparent from the foregoing description that the forms of the invention, illustrated in Figs. 1 to 20 inclusive, are directed to a coin operable and controlled dispensing device adapted to receive but a single coin of different denominations, while the form of the invention illustrated in Fig. 21 is adapted to receive a multiplicity of coins of like denomination.

As previously indicated herein, the extension of this last invention to include an arrangement whereby a multiplicity of different denomination coins may be simultaneously deposited is the subject matter of another and copending application, it being briefly stated herein that in that invention but a single tripping pin, such as 453, is utilized and for each size of coin there is provided a plate similar to 408 and another plate similar to 452, these two plates cooperating as shown herein, but all of these are so arranged that they "accumulate" so that the final plate carying the single tripping pin has a resulting clockwise setting up or accumulating movement determinable by the summation of the movements proportional to all of the coins deposited and proportional to the value thereof.

Without departing from the basic disclosure found in Fig. 21, it will be apparent that for any number of denominations of coins for which the machine is provided, there may be provided a corresponding number of latches 918, levers 912, plates 452 and plates 408, and each would then carry a tripping pin. These plates 452 would be spaced apart a sufficient amount to permit the latch portion 918E–918D to be interposed between the plates. The machine then can accommodate a plurality of like denomination of coins and be operable for any set of like denomination of coins and render full value thereof but this form of the invention cannot function for a plurality of different denominational coins.

In Figs. 22 and 23 there is illustrated a modified form of the invention which is adapted to receive and accommodate a plurality of coins of dissimilar denominations and which constitutes a summation device for coin value and which, when actuated manually following coin deposit, will automatically register the total sum of the coins deposited within the capacity of the machine and will automatically index the control member a corresponding amount corresponding to the volume to be dispensed for the predetermined summation value. In so doing, it is to be observed that the unit volume-price variation mechanism, previously described and as illustrated in Figs. 13 and 14, is contemplated as being included herein.

In view of the fact that the mechanism constitutes a coin summation arrangement, it has been necessary in this form of the invention to reverse the direction of the rotational travel of the measuring member incident to initial setting and the rotation of that member in the reverse direction incident to movement responsive to fluid flow discharge. As a consequence, the latch arrangement, previously described, must of necessity be reversed in position and be reversely operated. Other points of difference will be pointed out hereinafter more fully.

In Fig. 22 there is shown the main shaft 1009 which extends outwardly and carries an exposed handle of any suitable character which permits the shaft to be rotated counter-clockwise in order to register the coin summation arrangement and which is also adapted to actuate the motor control switch, as previously described.

It is also to be understood that the setback arrangement, shown in Figs. 12, 12A, 12B and 12C, are also contemplated as a part of the present invention but same are omitted herefrom for clearness and simplicity.

By referring to Fig. 12, it will be noted that the shaft 9 mounts the plate member 28 which carries the pin 31 and this actuates certain controls and this shaft also carries the wheel 9A with which is associated the setback cable 74. It will also be remembered that this arrangement is such that the magnetic stripper is employed. The only difference present in the present invention, insofar as coin entrance to the coin chute arrangement is concerned, consists in the fact that the guardplate or movable shutter 5 of Fig. 12 is omitted so that more than one coin can be inserted in each slot and two or more coins can be inserted in different slots. In the event improper coins, to-wit: a 25¢ piece is inserted in the 50¢ slot, or a dime be inserted therein, if not refused by the coin throwout mechanism, as previously described, the coins improperly inserted will be returned to the purchaser as hereinafter described.

To facilitate an understanding of the invention it is pointed out, see Fig. 22, that the platform 1498 pivoted at 1499 adjacent the coin return mechanism 1053 is retained and the former is associated with the member 1413A carried by the member 1413, the latter being pivoted as at 1116 and including the upwardly extending portion 1113 adapted for engagement by any one of the portions 1012F of the multiple lever structure mounted on the shaft 1015.

There are as many coin engageable members 1012F as there are denominations of coins which the machine is equipped to receive. There is herein, however, but one upper extension 1012 rigid with the shaft 1015 and movable by any one of the coin actuated portions 1012F mounted on shaft 1015. For clearness, the 50¢ actuated member 1012F only is illustrated in the extreme left-hand dotted line representation. The other members 12F would be progressively enlarged as required, that is, as indicated by the dotted lines immediately to the right of that dotted element 1012F. Such enlargement is necessary because the coins of different denominations vary while the operating throw of member 1012 must be the same for any coin. The first coin presented to one of the members 1012F is the coin that actuates or conditions the mechanism, that is, it opens the outlet valve, the shaft of which is indicated by 1101C and the lever 1101 of which is actuated by the member 1102 pivoted thereto at 1101B, as previously described. The dotted lines of members 1012 and 1012F and 1101 illustrate the open valve position. The full lines indicate the closed valve or idle pump position. It will be remembered that this is similar to the operation previously described for other forms of the invention; also, that even though the outlet valve be opened, and the motor switch be conditioned for closing, nevertheless, the motor switch is not closed until the shaft 1009 has been rotated, as previously described, to the full extent of its counter-clockwise movement. Then, and then only, is the motor switch closed and dispensing started. This is performed by the abutment on plate 28, see Fig. 7. This abutment is not shown, but is similar to abutment 29 shown in the earlier forms of the invention.

In the interval, however, the several coins deposited, and which are effective for machine operation, have registered their value and this summation of values has ben translated to the measuring member so that the actuating portion of the measuring member has been moved proportional to the sum of the values of the coins deposited subject to price variation adjustment. Upon fluid dispensing, this actuating member carried by the measuring member is reversely rotated and when the predetermined volume purchased has been dispensed, the control mechanism for the outlet valve is released, further dispensing ceases and the motor is deenergized and the parts can be returned to the coin receiving position.

Having thus compared, rather briefly, the cycle of operation, reference will now be had to the latch mechanism arrangement. Outlet valve operating lever 1101 is provided at its upper portion with a catch portion 1101A and positioned thereabove is the latch mechanism, generally indicated by the numeral 800, the same being pivoted in reversed relation from those previously described and at 818A.

Pivotally carried thereby at 818K is the latch member 800A which is tiltable clockwise on the pivot 818K in the movement of the valve operating lever 1101 from the full line position which is the closed valve position to the dotted position which corresponds to the open valve position. There may be provided, if desired, the adjusting member 818D' and there is provided the constraining spring 818H normally constraining the latch or catch portion 800A into the catching position. The spring, however, permits the latch portion 1101A to move past the member 800A in order to catch and lock the outlet valve lever 1101 in open valve position. Such operation is effected by member 1102 without raising the latch 800 on its pivot.

The member 1100D has a stop function in that it limits the clockwise tilting of the latch 800. The latch 800 is provided with a fixed abutment or projecting portion 818B and it will be noted that when any coin, and it is always the first effective coin, engages its appropriate portion 1012F and tilts the lever portion 1012 clockwise, said portion 1012 moves from the full line position into the dotted line position and in so doing the upper end of the member 1012 engages the inclined face of the catch portion 818B and elevates the latch 800 a sufficient amount to permit the lever 1012 to pass to the right so that it is thereafter caught by projection 818B and held in the dotted line position. Gravity is sufficient to hold the latch 800 in the trapping or locking position insofar as lever 1012 is concerned.

For reasons previously assigned, the latch 800 has the actuating face 818E adapted to be engaged by a pin 853 carried by a plate 847 when this plate rotates clockwise. In this rotation and immediately following such engagement, the latch 800 is elevated to release the lever 1012 and the lever 1101 from their respective holding members so that the outlet valve is returned to closed position and the lever 1012 is returned by gravity to the non-indicating or non-registering position.

The plate 847 is herein shown carried by the shaft 1049 but is not fixed thereto. However, the shaft 1049 is rigid with and does carry the ratchet 851 and the pawls 848 are mounted upon the plate 847 and are constrained by the spring 850 into ratchet engagement. Thus, the ratchet and pawl connection is a uni-directional connection permitting the member 847 to move in one direction about shaft 1049 without movement thereof and to move in the opposite direction with and by said shaft. It is here noted that mechanism hereinafter to be described rotates plate 847 counterclockwise to the desired amount determinable by the coin summation value or volume to be dispensed applied thereto. This is independent of shaft 1049, same in this form being incapable of anything but clockwise rotation. This summation moves tripping pin 853 as distant from latch end 818E as required.

Until dispensing actually starts this set up position of plate 847 is maintained. Upon dispensing being initiated shaft 1049 forthwith rotates clockwise and since it is uni-directionally coupled to plate 847, the latter now rotates clockwise. Fig. 22 shows the dotted pin 853 just prior latch engagement for latch release. The dotted positions of levers 1101 and 1012 correspond therewith. The aforesaid clockwise rotation, if continued, then tilts counterclockwise the latch 800 to release levers 1101 and 1012, thus permitting the outlet valve to close when the predetermined volume set up has been dispensed and the control lever 1012 to return to original position, see full lines, Fig. 22, thus requiring another manual cycle of operation if dispensing is to be effected.

In the foregoing connection note that the ratchet teeth slope both ways in Fig. 24 and since spring 850 is weaker than the holding power of shaft 49, the double sloped teeth of the pawls 848 in rotation of plate 847 cam upon the ratchet teeth, the spring yielding therefor, so that plate 847 can advance counterclockwise relative to shaft 49 for setting up purposes. When plate 847 is free to return for latch tripping the spring resistance is sufficient to hold the pawls to the ratchet for plate advance clockwise with and by the ratchet 851 and shaft 49.

However, inasmuch as in this form of the invention the plate 847 rotates in a direction the opposite of the previous plates 47, there is herein shown mounted on the shaft 1049 the gear 1411 which meshes with a gear 1412, the latter being carried by the shaft 802. The gear 1411 is rigid with the plate 847 and thus has indipendent rotational movement in one direction relative to the shaft 1049. It is the gear 1412 which actuates the plate 847 in setting up or summing up the values of the coins deposited and is utilized for actuation of the device. This gear 1412, as stated, is rigid with the shaft 802.

In the present form of the invention, there is disclosed a device which is adapted to receive not more than three half-dollar coins, not more than three twenty-five cent coins, not more than three five-cent coins and not more than three ten-cent coins. In other words, the machine, as illustrated, is arranged to dispense $2.70 worth of liquid in one dispensing operation. Of course, it is obvious that within the limits of construction possibilities, as by enlarging the wheels 1408, a greater number of coins can be accommodated.

It will be recalled in the initial description of this form of the invention that the guardplate 5 has been eliminated. This is to permit the potential purchaser to deposit a plurality of coins of the same or dissimilar denominations in the device. Herein is also retained the coin measuring reservoir or magazine 1497, there being one magazine for each denomination of coins and each is associated with the appropriate coin slot. There is also provided in juxtaposition to each of these magazines, coin guard portion 1410 and the dotted lines to the right of Fig. 22 indicate the successive guard portions for 5¢, 10¢ and 25¢ coins in their respective reservoirs.

Mounted in each coin chamber arrangement, as it were, and communicating with each coin denomination chute is a segmental wheel indicated by the numeral 1408 and carried by the shaft 1009 and having the relieved portion 1408C and the opposite terminus 1408F.

The wheel in the 50¢ chamber is shown provided with three 50¢ receiving recesses 1408A. The lower part of each recess is elongated, as indicated at 1408G, and the lower or bottom portion thereof is inclined laterally as at 1408H. The purpose of this elongation and this inclination is to reject from the recesses any coins which are smaller than half-dollars. In other words, no coin can enter and be retained in the magazine which is smaller in size than a half-dollar which will be perfectly evident from an examination of the upper right-hand portion of Fig. 22 and, furthermore, a coin larger than a 50¢ piece cannot enter the coin slot in the sizing plate, not shown, it being noted that in Fig. 5 there are in plate 31 but three slots indicated for three different valued coins, whereas in the present embodiment of the invention, the same is adapted to accommodate four different denominations of coins, in other words there would be four coin size channels and four slots in the sizing plate. In the next chamber adjacent the 50¢ chamber, there is another wheel similar to the wheel 1408 and similarly provided with recesses 1408A which are elongated and terminate in inclined bottoms, as previously described. These recesses are sized to receive a 25¢ coin and to pass through offsets 408H coins of smaller size accidentally deposited in that particular coin chute and chamber.

In like manner, a third wheel is suitably recessed to receive 5¢ coins and these recesses are similarly elongated and provide inclined bottoms 1408H for the rejection of smaller coins, to-wit: pennies and dimes. Still another wheel is arranged to receive only dimes and retain the same and, inasmuch as there is no smaller metallic coin, the recess is not elongated, etc., all as shown in Fig. 22.

Referring to Figs. 22 and 23, it will be observed that there are a series of dotted vertical lines designated by the numeral 890. These represent coin chutes which terminate at 891, see Fig. 23, at their upper ends in the coin chamber forming plate structures so that any coin which passes through the elongated portion of the recess will be presented laterally by reason of the inclined bottom 1408H to the adjacent coin return chute 890 and thus returned to the customer.

As previously set forth with reference to the form of the invention shown in Fig. 21, any surplus coins of a like denomination beyond the capacity of the machine to accommodate the same are refused by the magazine 1497 of that denomination and returned to the purchaser through the passage E. In the event that any coin does not seat in the recess of the adjacent coin receiving plate but rides the periphery of said plate, the said riding coin will escape downwardly as previously described, with reference to the form of the invention shown in Fig. 21, and be returned to the purchaser. Except for certain reversals and gearing, it will be obvious that all of the foregoing description relative to Figs. 22 and 23 is very similar to that previously given in referring to Fig. 21.

However, it is to be noted that one distinction has to be made and that is this: that the several recesses on the several coin carrying plates 1408 must be so positioned relative to each other in the same plate and with reference to the other recesses in the other plates that no two coins can register or be operative for transfer purposes at any one time. Thus, it is assured. since all these coin carrying plates are secured to shaft 1009 that in the single rotation of that shaft from the coin chute receiving or initial position through the coin receiving position and thence over into the coin actuating position and finally to the final conditioning position for insuring fluid dispensing, that the coins either are returned to the purchaser or are registered by means of the transfer mechanism now to be described, it being understood that in each coin chamber there is provided a stripper plate 1410A' similar to the stripper plate 410A, see Fig. 21, and having a like purpose. This insures coin retention by the coin plate of the coins for subsequent control purposes after the coin has had its value registered in the transfer mechanism.

It will be noted that member 1410A' is duplicated in each coin chamber arrangement, as indicated by the dotted lines immediately to the right and downwardly of the full line showing of the half-dollar coin retaining member 1410A'.

Other than the reversals previously mentioned and the critical positioning of the coin recesses of the respective plates 1408, the most important part of the present embodiment of the invention remains to be described. This is the transfer and coin value summation device.

It will be remembered that shaft 802 is geared to plate 847 through the meshing gears 1411 and 1412. It will also be remembered that plate 847 mounts mechanism similar to that shown in Figs. 13 and 14 and this mechanism in turn includes the single actuating pin 853, this adjustable connection between the pin 853 and the plate being provided by the unit volume-price arrangement adjustment. Freely floating on the shaft 802 and in coplanar registration with each associated coin plate 1408 is a plate 801 having a recess 852A and herein but one recess. This recess 852A is adapted to seat the upper portion of the selected coin, the lower portion of which is received by the adjacent recess 1408A and in the counter-clockwise rotation of shaft 1009 this coin causes rotation clockwise of the wheel 801 from the point of coin admission or registration to the point of coin stripping or release.

Secured to the rear face of each plate 801 as at 807A is a spring 807, the opposite end of which is rigidly mounted as at 807B and this mounting upon the framework may be of adjustable character, if desired. It will be obvious that in the clockwise movement of the respective plate 801, incident to coin operation and coin actuation the spring 807 is elongated and thus powered to return the plate 801 to its original position which is determinable by the stationary pin 804 carried by the partition plates forming the coin chambers, the wheel 801 being notched as at 801A for that purpose and the length of this notch is sufficient to provide for coin movement up to and including the point of coin release or escape from said wheel.

Mounted on each plate 801, as at 805D, is a pawl 805 having a toothed portion 805A and constrained by a spring 803 into tooth engagement of a member to be described. The spring is rigidly fastened at one end to the pawl and the free end bears against a pin 808 carried by the plate 801. Extending across the coin chamber and immediately above the point of coin release or escapement is a pin 809 upon which bears the lower face of pawl 805. This particular pawl has a lower face recessed as at 805E to insure quick seating of the tooth 805A in the transfer wheel now to be described.

Adjacent each of the plates 801 is a transfer wheel 806, all transfer wheels 806 being rigid with the shaft 802. These transfer wheels have toothed peripheries which are so arranged that the teeth are in alignment in all of the transfer wheels and the distance between teeth is that of the smallest coin denomination, herein the distance between any two teeth representing the equivalent of 5¢ in value.

It is also to be observed, see the dotted lines in Fig. 22, that each of the pawls 805 have slightly different outlines necessitated by reason of the utilization of dissimilar size coins and corresponding to the tooth to be engaged and the release therefrom.

Before proceeding further, it is to be noted that whenever any coin carrier receives a coin in its recess and the same coin so received registers with its appropriate recess 852A in the corresponding or mating wheel 801, that rotation of shaft 1009 counterclockwise causes, as previously described, rotation of the plate 801 clockwise and the amount of rotation is so arranged that when the coin is freed from the wheel 801, the wheel 801 has been moved an angular distance corresponding to the number of teeth equivalent to the coin value.

Upon initial engagement of the coin with the wheel 801, the pawl travels with the wheel 801 incident to coin travel by reason of the rotation of the plate 1408. As the wheel 801 rotates clockwise, it will be obvious that the pawl pivot 805D moves similarly and due to the spring 803 tending to tilt said pawl, when the rotation is sufficient the pawl is free from the pin 809 and the spring seats the pawl in the appropriate tooth of the adjacent ratchet gear 806. Thereupon, continued movement of the coin carrier with the coin therein secures rotation clockwise of plate 801, as well as transfer wheel 806 until such time as the coin is released.

At the time the coin is released, the spring 807 becomes effective to return the wheel 801 back to the initial or starting position which is when the wheel is positioned to engage the stop 804. In this return movement, the pawl rides the ratchet gear until the pawl carried by the wheel 801 engages the pin 809 and in so doing the pin 809 insures that despite the effects of the spring 803, this pawl 805 does not reengage the ratchet wheel unless and until a second coin of the same denomination is presented by a second recess of the same coin carrier plate 1408 to the only recess 852A in the mating plate, whereupon the operation is repeated so that it is obvious that the wheel 801 has intermittent, oscillatory movement if more than one coin of the corresponding denomination is utilized.

It will be remembered that the recesses of the respective coin carrier plates are staggered, as it were, so that no coin can register its effect while another coin is registering its effect so that it is quite clear that if all the coins for which the machine is designed are presented, each coin will have its coin value register and the summation thereof will be imposed, as it were, upon the shaft 802 and by it as the summation is being effected, transferred through the gearing 1411 and 1412 to the wheel 847, the latter moving counterclockwise in the setting up direction with shaft 1049 movement, it being understood that during this transfer and set up period the meter and the computer or computer drive is ineffective because the motor has not been started.

It will be apparent from the foregoing that it is immaterial or it is not essential that a coin of every denomination be employed. It is also apparent that only a single coin of any denomination need be employed and only that amount of fluid will be dispensed corresponding to the coin value. This is because the several transfer wheels 806 are all identical and no matter which coins are utilized in actuation, the value effect thereof is transferred as coin after coin is presented or becomes effective.

After the latch releasing pin or actuator 853 has been moved counter-clockwise the amount corresponding to the value of the coins deposited and proportional to the amount of fluid to be dispensed corresponding to said coin value, the final movement of the shaft 1009 incident to the coin carrier travel to the extreme limit of its counter-clockwise movement through the mechanism previously described as found in the other embodiments of the invention, the functions of which are retained in this embodiment, insures closing of the motor switch. Previous thereto the initial coin of whatever denomination is presented to the appropriate lever 1012F has conditioned the outlet valve in open position and has locked the control lever 1012 in the locked or dispensing position. All subsequent coins, after the first coin has registered its effect, are subsequently discharged from the coin carrying plate 1408 and are collected on the platform 1498 prior to the switch closing, as previously described and as shown in the form of the invention disclosed in Fig. 21.

Upon dispensing actuation occurring, the computer, etc., operates the shaft 1049 and in this instance in a clockwise direction, which by reason of the pawl and ratchet connection shown in Fig. 22 previously described, rotates the plate 847 clockwise and brings the actuating member 853 into engagement with the latch 800 and when that latch is tripped, which is the zero position, the outlet valve is closed, lever 1012 is released and the motor switch is released and returned to the open circuit condition and open circuit condition position, all as previously described relative to Figs. 1 to 12 inclusive, and all the coins used for summation purposes are forwarded to the coin box being released to the left of the abutment 1053, as described more particularly in connection with the form of the invention shown in Fig. 21.

Thereafter, the coin carrying plates 1408, together with the shaft 1009, must be returned to the original coin receiving position, as previously described, so that the mechanism is arranged to receive additional coins. It will be obvious that the hose hanger lever control, shown in either Figs. 15 or 16, may be incorporated and included in this embodiment of the invention and in that event the motor switch will not be closed until the hose is removed from its hanger even though the manual shaft 1009 be moved to its final position counter-clockwise and the outlet valve be opened and the entire mechanism otherwise conditioned to dispense liquid except for actual closure of the motor circuit.

It will be remembered that the plate 847 has been returned to the zero or starting position by fluid dispensing actuation only and it will also be observed that the plates 801 are always returned to their zero or starting position by the springs 807. This is because there is no meshing engagement or meshing means between the plate 801 and its corresponding plate 1408. The summation device, or what has been termed the summation ratchets, are all returned to zero position in the return movement and simultaneously with the return of the plate 847 incident to fluid dispensing.

For simplicity, the 5¢ pawl has intentionally been omitted. Note that a 50¢ coin advances shaft 802, the equivalent of ten ratchet teeth, a 25¢ coin advances its ratchet the equivalent of five ratchet teeth, a dime advances said shaft the equivalent of two ratchet teeth and a nickel advances said shaft the equivalent of one ratchet tooth.

It is obvious that the coins to be utilized must have a common denominator. In this instance, such denominator is the value of 5¢.

It is also noted that shaft 802 may mount adjacent the housing a scale wheel 880 which has its calibrations visible through an opening in the housing.

In the form of the invention shown in Fig. 1 to Fig. 12 inclusive, it will be recalled that if the hand operated valve at the end of the hose is closed before automatic closing of the control valve, all of the fluid will not be withdrawn for any coin value setup determined by the pump. The motor will, of course, continue to operate until the switch is opened manually or by hose replacement on its hanger, see Fig. 15. In the latter instance, it is to be observed that the inter control to return the measuring means to the initial position must be left in the switch closing position until the full sale of liquid for the coin utilized has been dispensed. To this extent, the interlock arrangement 59D', member 109 and member 112 must be omitted.

Now all of the aforesaid relates to a single coin actuation. When it is desired to utilize a plurality of coins of a single denomination, then the form of the invention shown in Fig. 21 is utilized. If, however, it is desired to have the dispensing device receive a plurality of coins of unlike denomination, the form of the invention shown in Figs. 22 and 23 will be utilized. In these forms of the invention, it will, of course, be understood that return of the hose to its support does not return automatically the measuring device to its original position. But it does secure cessation of pumping through the stopping of the motor. Removal of the hose from the hanger automatically secures energization of the motor and further dispensing results with further movement of the measuring means toward the so-called tripping position. Hence, in the form, Fig. 21, member 59D', member 109 and member 112 would not be utilized, although not shown in Fig. 21 and the preceding description with reference to the latter included such members for station operation where the station operator has access to the coin box.

When all of the liquid which has been purchased has been ultimately dispensed by reason of one or more dispensing operations of the character described, the pump will have to be reconditioned for further dispensing by the deposition of one or more coins. Thus, for example, if the invention be arranged to accommodate dollars, halves and quarters, it is clear that the value unit of that form of the invention, as illustrated in Figs. 22 and 23, would be 25¢ instead of 5¢, but the 10¢ and 5¢ value can be retained.

The operator could, therefore, deposit any amount, for example, three dollars, three halves and three quarters, for the purchase of $5.25 worth of liquid and from the pump there could be dispensed intermittently any amount of fluid or portion thereof corresponding to the amount purchased. The dial index or legending would indicate in each instance, the total value purchased, see 880 in Fig. 23, and would also indicate the final value at each sale, see Figs. 1 and 2, 404. In this type of dispensing, the computer indicates the money value and volume of each individual dispensing and the elimination or disconnecting of cable 74 permits manual setting of the computer to zero without interfering with the coin actuating mechanism. If desired, such indicator returning mechanism could be connected to the hose hanger lever as by connecting cable 74 to lever 110, so that upon each return of the hose to its hanger, this last mentioned indicator would be returned to zero by tilting lever 110.

It will be quite obvious that the changes necessary in Fig. 22 to accommodate a $5.25 worth value requires merely the use of proper coin receiving members, the spaces of which are properly offset relative to each other in the same coin carrier and adjacent coin carriers. The other changes necessary would be that in the respective gear ratios and in the diameter of the coin receiving member or members and spacing of the coin receiving recesses therein.

The resulting construction is one which is coin controlled but manually operable. The dispensing operation is one of initial purchase in an amount corresponding to the available coins within the capacity of the machine that the station attendant may have. The actual dispensing of the fluid purchased by the customer is of that amount or a lesser amount, and if a lesser amount, the dispensing operations may be repeated until the full measure of liquid to be dispensed corresponding to the total coin value has been dispensed.

The coins and the liquid, thus, are always under the control of no one but the authorized person or those having the keys to the fill pipe lock and the coin box lock.

It is apparent that the lessor of such equipment, at lessor's election, can sell to the station operator, tokens, which the pumps are conditioned to receive, and these then would be used in lieu of actual coins. Thus, the incentive for robbery, accompanied by pump damage or destruction will be materially reduced. Of course, the operator would be responsible for all other than authorized tokens found by the collector in the coin box.

While the invention has been illustrated and described in great detail in the foregoing description, the same is to be considered as illustrative and not restrictive in character.

The several modifications described herein, as well as others which will readily suggest themselves to persons skilled in this art, all are considered to be within the broad scope of the invention, reference being had to the appended claims.

The invention claimed is:

1. In a liquid dispensing apparatus, the combination of a source of liquid supply, a pump having the suction side thereof connected to said source of liquid supply, a meter connected to the outlet side of said pump, a computer connected to and operable in accordance with meter operation, a dispensing line connected to the meter discharge, a valve included in said dispensing line and controlling the dispensing of said line, means automatically rendering said apparatus inoperative and closing said valve when a predetermined amount of liquid has been dispensed, and coin actuated means for controlling in terms of cost the predetermined amount of liquid to be dispensed and operatively associated with said last mentioned means, said coin actuated means including a predetermined stop mechanism movable in accordance with the control coin value to insure delivery of an amount corresponding to the value of the coin, said mechanism being reversely movable through the computer movement for cessation of dispensing.

2. In a liquid dispensing apparatus, the combination of a source of liquid supply, a pump having the suction side thereof connected to said source of liquid supply, a meter connected to the outlet side of said pump, a computer connected to and operable in accordance with meter operation, a dispensing line connected to the meter discharge, a valve included in said dispensing line and controlling the dispensing of said line, means automatically rendering said apparatus inoperative and closing said valve when a predetermined amount of liquid has been dispensed, and coin actuated means for controlling in terms of cost the predetermined amount of liquid to be dispensed and operatively associated with said last mentioned means, said coin actuated means including a predetermined stop mechanism movable in accordance with the coin to insure delivery of an amount corresponding to the value of the coin, said mechanism being reversely movable through the computer movement for cessation of dispensing, said coin actuated means being of multiple coin reception character and said predetermined stop being movable in the first mentioned direction proportional to the total summation value of the coins utilized.

3. In a dispensing pump, the combination of a discharge line, means for supplying said line with fluid, a plurality of coin operable means, control means for said line, a corresponding number of controls for said means, and means including a plurality of control members corresponding in number to the coin operable means, said last mentioned means being operable an amount in one direction in accordance with the coin operable means and reversely operable by fluid flow, the control member corresponding to the coin operable means actuating the corresponding control for control means operation upon discharge of the coin selected amount of fluid.

4. In a dispensing apparatus, the combination of a pump, an electric motor therefor, switch means for said motor, a dispensing discharge for said pump including a control valve, means for measuring the discharge from the pump through said valve, coin controlled means for opening said valve and closing said switch means, means operable by the measuring means and in accordance with the coin value to close said valve and open said switch means upon the discharge of fluid through said valve corresponding to the coin value, and means for retaining the actuating coin in position for return to the purchaser or discharge beyond control of the purchaser until the predetermined discharge has been effected.

5. In a dispensing apparatus, the combination of a pump, an electric motor therefor, switch means for said motor, a dispensing discharge for said pump including a control valve, means for measuring the discharge from the pump through said valve, coin controlled means for opening said valve and closing said switch means, means operable by the measuring means and in accordance with the coin value to close said valve and open said switch means upon the discharge of fluid through said valve corresponding to the coin value, means for retaining the actuating coin in position for return to the purchaser or discharge beyond control of the purchaser until the predetermined discharge has been effected, and means for returning the coin to the purchaser in the event discharge is not effected.

6. In dispensing apparatus, the combination of a fluid meter, a computer, pump means connected to the meter for fluid operation of the latter and the computer, coin selecting means, a plurality of similar mechanisms each selectively operable by a predetermined value coin, and operable by the coin selecting means, and means operable by the pump means and a selected one of the similar mechanism for fluid control, the computer being of manually adjustable character for unit volume-price variation.

7. In dispensing apparatus, the combination of fluid supplying motor operable means, an outlet valve controlling the discharge therefrom, a meter, a computer, said meter and computer being operable proportional to fluid discharge, coin selecting means, a plurality of similar mechanisms each selectively operable by a predetermined value coin and operable by the coin selecting means, and means operable in response to actuation of any one of the mechanisms for opening the outlet valve and for determining the extent of the fluid discharge, and operable in response to fluid discharge to close said outlet valve upon predetermined discharge and render said motor operable means inoperative for further discharge, the computer being of manually adjustable character for unit volume-price variation.

8. In dispensing apparatus, the combination of a fluid meter, a computer, a pump means connected to the meter for fluid operation of the latter and the computer, coin selecting means, a plurality of similar mechanisms each selectively operable by a predetermined value coin, and operable by the coin selecting means, and means operable by the pump means and a selected one of the similar mechanism for fluid control, the last mentioned means including a plurality of adjustable trip elements corresponding in number to the mechanisms, and simultaneously proportionately adjustable in accordance with coin value variation.

9. In dispensing apparatus, the combination of fluid supplying motor operable means, an outlet valve controlling the discharge therefrom, a meter, a computer, said meter and computer being operable proportional to fluid discharge, coin selecting means, a plurality of similar mechanisms each selectively operable by a predetermined value coin and operable by the coin selecting means, and means operable in response to actuation of any one of the mechanisms for opening the outlet valve and for determining the extent of the fluid discharge, and operable in response to fluid discharge to close said outlet valve upon predetermined discharge and render said motor operable means inoperative for further discharge, the last mentioned means including a plurality of adjustable trip elements corresponding in number to the mechanisms, and simultaneously proportionately adjustable in accordance with coin value variation.

10. In a dispensing apparatus, fluid pressure supplying means, a control therefor, an outlet valve for the discharge from said means, a hose for dispensing said discharge, a support for said hose, means responsive to hose movement from said support for actuating said control, coin operable means for controlling said valve, and means interposed between said coin operable means and said second mentioned means and constituting an interlock to prevent fluid discharge responsive to hose movement until said coin operable means is coin actuated.

11. In a dispensing apparatus, fluid pressure supplying means, a control therefor, an outlet valve for the discharge from said means, a hose for dispensing said discharge, a support for said hose, means responsive to hose movement from said support for actuating said control, coin operable means for controlling said valve, means interposed between said coin operable means and said second mentioned means and constituting an interlock to prevent fluid discharge responsive to hose movement until said coin operable means is coin actuated, and means operable upon supplying means cessation of operation and interposed between the supplying means and the hose movable means and constituting an interlock to prevent additional fluid discharge until the hose has been returned to its support, and said coin operable means is manually returned to coin receptive condition.

12. In a dispensing apparatus, fluid pressure supplying means, a hose connected to said supplying means for dispensing fluid supplied thereby, a support for said hose, an outlet valve controlling hose discharge, coin operable means controlling said outlet valve, and other means responsive to supply means failure and hose return movement to its support for closing said outlet valve upon coin return to the purchaser.

13. In a dispensing apparatus, the combination of pressure fluid supply means, coin actuated means controlling said supply means, an outlet valve connected to the supply means and arranged to control the discharge therefrom and opened in response to coin actuation, means for coin return upon fluid supply means failure to supply fluid, and means having operative association with the coin return means and the fluid supply means and arranged to prevent coin return upon fluid discharge.

14. In dispensing apparatus adapted for repetitious single cycle operation, the combination of pressure fluid supply means, an outlet valve controlling the discharge therefrom, coin receiving means, means operable by the coin receiving means for conditioning said valve to open position and determining the amount of fluid to be dispensed, and means operable to return simultaneously the coin receiving means, third mentioned means and outlet valve to starting position.

15. Apparatus as defined by claim 14, characterized by the addition of means responsive to pressure fluid supply means initial failure to retain said coin receiving means operable means in initial fluid amount determining position and permitting return of said coin receiving means to coin receiving position and the outlet valve to closed valve position.

16. Apparatus as defined by claim 14, characterized by the addition of means for coin return upon fluid supply means failure to supply fluid, and means having operative association with the coin return means and the fluid supply means and arranged to prevent coin return upon fluid supply.

17. Apparatus as defined by claim 14, characterized by the addition of means responsive to pressure fluid supply means failure to retain said coin receiving means operable means in initial fluid amount determining position and permitting return of said coin receiving means to coin receiving position and the outlet valve to closed valve position, means for coin return upon fluid supply means failure to supply fluid, and means having operative association with the coin return means and the fluid supply means and arranged to prevent coin return upon fluid supply.

18. In a dispensing apparatus adapted for repetitious single cycle operation, the combination of fluid supply means, means for controlling the same to insure a predetermined fluid discharge, means for returning said control means to starting position upon predetermined fluid discharge, means preventing such return upon initiation of a dispensing fluid flow, and coin operable means for controlling the controlling means and preventing operation of the latter until the coin operable means is coin actuated.

19. Apparatus as defined by claim 18, characterized by the addition of means for retaining a coin in operative association with the coin operable means until the predetermined fluid discharge has been effected.

20. Apparatus as defined by claim 18, characterized by the addition of means for coin return upon fluid supply means failure to supply fluid, and means having operative association with the coin return means and the fluid supply means and arranged to prevent coin return upon fluid supply.

21. Apparatus as defined by claim 18, characterized by the addition of means for retaining a coin in operative association with the coin operable means until the predetermined fluid discharge has been effected, means for coin return upon fluid supply means failure to supply fluid, and means having operative association with the coin return means and the fluid supply means and arranged to prevent coin return upon fluid supply.

22. In a dispensing apparatus, the combination of means supplying a uniform flow of fluid, means responsive to said flow, other means for determining the amount of fluid to be flowed, means operating the last mentioned means, and means for causing cessation of flow upon said third mentioned means operation responsive to fluid flow and in the predetermined amount determinable thereby, the third mentioned means being of multiple character and the fourth mentioned means being arranged for multiple position control of the third mentioned means for initial positioning of the latter, said fourth mentioned means being of coin actuable character and selectively operable in accordance with any one of a plurality of coins of different denominations.

23. In a dispensing apparatus, the combination of means supplying a uniform flow of fluid, means responsive to said flow, other means for determining the amount of fluid to be flowed, means operating the last mentioned means, and means for causing cessation of flow upon said third mentioned means operation responsive to fluid flow and in the predetermined amount determinable thereby, the third mentioned means including stop means capable of positioning in a plurality of positions, said fourth mentioned means being arranged for selective positioning of said third mentioned means and said stop means in any one of a multiplicity of positions, said fourth mentioned means being of multiple coin actuable type and movable in accordance with the number of coins applied thereto for actuation.

24. In a dispensing apparatus, the combination of means supplying a uniform flow of fluid, means responsive to said flow, other means for determining the amount of fluid to be flowed, means operating the last mentioned means, and means for causing cessation of flow upon said third mentioned means operation responsive to fluid flow and in the predetermined amount determinable thereby, the third mentioned means including stop means capable of positioning in a plurality of positions, said fourth mentioned means being arranged for selective positioning of said third mentioned means and said stop means in any one of a multiplicity of positions, said fourth mentioned means being of multiple coin actuable type and movable in accordance with the number of coins applied thereto for actuation, said multiple coins being of like denomination.

25. In a dispensing device the combination of a volume setting arrangement, coin operable means for actuating said volume setting arrangement and in an amount proportional to the value of the coin employed, means for selectively trapping the coin or returning the same to the purchaser, means for supplying fluid and automatically controlled by the coin operable means and operatively associated with the volume setting arrangement and operable by the latter when the predetermined amount of fluid has been dispensed, said coin operable means being movable from a coin receiving position to a subsequent actuating position and returnable therefrom and in returning actuating the coin returning means for coin return to the purchaser, and an interlock operatively associated with the coin operable means and the volume setting arrangement for preventing fluid supply upon coin return and for returning said volume setting arrangement to zero position.

26. A fluid dispensing device as defined by claim 25, characterized by said volume setting arrangement including an adjustable mechanism for unit volume-price variation adjustment.

27. A device as defined by claim 25, characterized by the addition of a computer operable in response to fluid discharge, an operative connection between said computer and said volume setting arrangement and of uni-directional character effective only for arrangement operation in fluid dispensing, said arrangement being effective for cessation of fluid discharge upon dispensing of the predetermined amount of fluid, and a resetting mechanism operatively associated with the computer for resetting said computer, the resetting operation being in a direction the reverse of the uni-directional connection and ineffective for arrangement movement in the reverse direction.

28. A device as defined by claim 25, characterized by the addition of a computer operable in response to fluid discharge, an operative connection between said computer and said volume setting arrangement and of uni-directional character effective only for arrangement operation in fluid dispensing, said arrangement being effective for cessation of fluid discharge upon dispensing of the predetermined amount of fluid, a resetting mechanism operatively associated with the computer for resetting said computer, the resetting operation being in a direction the reverse of the uni-directional connection and ineffective for arrangement movement in the reverse direction, said volume setting arrangement including an adjustable mechanism for unit volume-price variation adjustment.

29. In a meter dispensing pump, the combination of a dispensing discharge line having an outlet valve therein, a meter driven computing mechanism, coin actuated control means for opening said valve upon coin actuation and operable in accordance with mechanism operation for closing said valve, a dispensing hose, a support therefor, and means automatically operable upon hose removal from its support for conditioning the pump for fluid discharge.

30. In a meter dispensing pump, the combination of a dispensing discharge line having an outlet valve therein, a meter driven computing mechanism, coin actuated control means for opening said valve upon coil actuation and operable in accordance with mechanism operation for closing said valve, a dispensing hose, a support therefor, and means automatically operable upon hose removal from its support for conditioning the pump for fluid discharge, return of the hose to its support automatically securing cessation of fluid discharge.

31. In a meter dispensing pump, the combination of a dispensing discharge line having an outlet valve therein, a meter driven computing mechanism, coin actuated control means for opening said valve upon coin actuation and operable in accordance with mechanism operation for closing said valve, a dispensing hose, a support therefor, means automatically operable upon hose removal from its support for conditioning the pump for fluid discharge, and interlock means operable by the mechanism, following predetermined selected fluid discharge and preventing hose operable means movement following such discharge until additional coin actuation of the control means is effected.

32. In a meter dispensing pump, the combination of a dispensing discharge line having an outlet valve therein, a meter driven computing mechanism, coin actuated control means for opening said valve upon coin actuation and operable in accordance with mechanism operation for closing said valve, a dispensing hose, a support therefor, means automatically operable upon hose removal from its support for conditioning the pump for fluid discharge, interlock mean operable by the mechanism, following predetermined selected fluid discharge and preventing hose operable means movement following such discharge until additional coin actuation of the control means is effected, and coin operable means for releasing said interlock means to permit hose operable means movement for the purpose described.

33. In a meter dispensing pump, the combination of a dispensing discharge line having an outlet valve therein, a meter driven computing mechanism, coin actuated control means for opening said valve upon coin actuation and operable in accordance with mechanism operation for closing said valve, a dispensing hose, a support therefor, means automatically operable upon hose removal from its support for conditioning the pump for fluid discharge, return of the hose to its support automatically securing cessation of fluid discharge, and interlock means operable by the mechanism, following predetermined selected fluid discharge and preventing hose operable means movement following such discharge until additional coin actuation of the control means is effected.

34. In a meter dispensing pump, the combination of a dispensing discharge line having an outlet valve therein, a meter driven computing mechanism, coin actuated control means for opening said valve upon coin actuation and operable in accordance with mechanism operation for closing said valve, a dispensing hose, a support therefor, means automatically operable upon hose removal from its support for conditioning the pump for fluid discharge, return of the hose to its support automatically securing cessation of fluid discharge, interlock means operable by the mechanism, following predetermined selected fluid discharge and preventing hose operable means movement following such discharge until additional coin actuation of the control means is effected, and coin operable means for releasing said interlock means to permit hose operable means movement for the purpose described.

35. In a coin operable dispensing pump the combination of an outlet valve for controlling fluid discharge, coin receiving means adapted to receive a plurality of coins of like and dissimilar denominations, means for registering the summation value of said coins, means operable by one of the coins for conditioning the outlet valve for dispensing purposes, means operable by the summation means and operatively associated with the outlet valve control means and operable in response to fluid flow through the outlet valve for effecting cessation of discharge upon the discharge of fluid in an amount corresponding to the summation value of the coins.

36. A coin operable dispensing pump of the character as defined by claim 35, characterized by said pump including an electric switch for controlling electric pumping means, and means controlling said electric switch and operable by the coin receiving means.

37. A dispensing pump of the character defined by claim 35, characterized by the addition of means for varying the unit volume to price ratio and interposed between the measuring means and the coin value summation means.

38. A dispensing pump of the character defined by claim 35, characterized by the addition of electrically operable fluid supply means, electric switch means for the control thereof, a dispensing hose having operative communication with the outlet valve, and means operable by hose movement for automatically controlling said electrically operable fluid supply means.

39. In a dispensing device the combination of means operable in one direction in response to and proportional to the amount to be dispensed, a coin receiving mechanism adapted to receive a plurality of coins of like and dissimilar denominations, a plurality of similar transfer arrangements, there being as many arrangements as the device is adapted to accommodate different coin denominations and arranged for operation by the coins, the latter serving as an operative connection between the coin receiving mechanism and the arrangements, means operatively associated with each of the transfer arrangements and having a common operative connection with the first mentioned means for moving the same in an opposite direction and in an amount proportional to the summation value of the coins associated with the coin receiving mechanism.

40. A device as defined by claim 39, characterized by said first mentioned means including a uni-directional clutch and means responsive to the dispensing and operatively connected to the measuring means by said clutch for first mentioned means movement in the first mentioned direction, and non-responsive to first mentioned means movement in the second-mentioned direction incident to coin receiving mechanism movement.

41. A multiple coin, multiple denomination apparatus including a plurality of coin receiving members each recessed to receive and seat a plurality of like denomination of coins in sequential order and capable of to and fro movement, a coplanar cooperating member capable of to and fro movement and having a cooperating coin receiving recess in the face confronting the coin receiving member recessed face, a coin seatable in the confronting recesses imparting movement of the coin receiving member in one direction to the confronting member in a corresponding direction, a value transfer element adjacent the confronting member, and a uni-directional connection between said confronting member and the value transfer member for effecting movement of the transfer member in the coin actuatable movement of the confronting member and in an amount proportional to the coin value, said uni-directional connection being automatically disconnected upon completion of such value movement, and means effective upon such disconnection for automatically returning the confronting member to original position for similar and sequential coin operation by sequentially seated coins in the first mentioned member and without return of the transfer member for coin value summation purposes.

LEO E. RUSH.

REFERENCES CITED

The following references are of record in the file of this patent:

UNITED STATES PATENTS

| Number | Name | Date |
| --- | --- | --- |
| 537,448 | Greefkeus | Apr. 10, 1895 |
| 635,730 | Luke | Oct. 24, 1899 |
| 855,061 | King et al. | May 28, 1907 |
| 957,535 | Aron | May 10, 1910 |
| 1,008,108 | Beaumont | Nov. 7, 1911 |
| 1,524,620 | Hatmaker | Jan. 27, 1925 |
| 1,580,113 | Bonney | Apr. 13, 1926 |
| 1,607,899 | Long | Nov. 23, 1926 |
| 1,628,194 | Robinson | May 10, 1927 |
| 1,673,305 | Yont et al. | June 12, 1928 |
| 1,685,481 | De Hart | Sept. 25, 1928 |
| 1,816,526 | Hall | July 28, 1931 |
| 1,831,965 | Marden | Nov. 17, 1931 |
| 1,843,674 | Hinds | Feb. 2, 1932 |
| 1,866,523 | Alexander | July 12, 1932 |
| 1,879,876 | Krause | Sept. 27, 1932 |
| 1,888,533 | Jauch et al. | Nov. 22, 1932 |
| 1,890,616 | Krause | Dec. 13, 1932 |
| 1,891,950 | Rush | Dec. 27, 1932 |
| 1,910,978 | Allison | May 23, 1933 |
| 1,967,633 | Smith | July 24, 1934 |
| 1,970,361 | DeLancey | Aug. 14, 1934 |
| 1,977,606 | Benaiges | Oct. 23, 1934 |
| 2,012,563 | Hazard | Aug. 27, 1935 |
| 2,022,932 | De Lancey | Dec. 3, 1935 |
| 2,044,926 | Welch et al. | June 23, 1936 |
| 2,058,138 | De Lancey | Oct. 20, 1936 |
| 2,082,788 | Brayer | June 8, 1937 |
| 2,161,920 | Fraser | June 13, 1939 |
| 2,169,635 | Carroll | Aug. 15, 1939 |
| 2,180,821 | Ginnel | Nov. 21, 1939 |
| 2,217,662 | Baber | Oct. 15, 1940 |
| 2,228,820 | Griffith | Jan. 14, 1941 |

FOREIGN PATENTS

| Number | Country | Date |
| --- | --- | --- |
| 294,678 | Great Britain | July 26, 1928 |